United States Patent
Sugiyama

(10) Patent No.: US 10,228,548 B2
(45) Date of Patent: Mar. 12, 2019

(54) CATADIOPTRIC PHOTOGRAPHIC LENS

(71) Applicant: NIKON CORPORATION, Tokyo (JP)

(72) Inventor: Yoshikazu Sugiyama, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/435,822

(22) PCT Filed: Oct. 11, 2013

(86) PCT No.: PCT/JP2013/077785
§ 371 (c)(1),
(2) Date: Jul. 29, 2015

(87) PCT Pub. No.: WO2014/061595
PCT Pub. Date: Apr. 24, 2014

(65) Prior Publication Data
US 2015/0346470 A1    Dec. 3, 2015

(30) Foreign Application Priority Data
Oct. 15, 2012   (JP) ................. 2012-227559

(51) Int. Cl.
*G02B 13/18*    (2006.01)
*G02B 3/02*     (2006.01)
*G02B 17/08*    (2006.01)

(52) U.S. Cl.
CPC ......... *G02B 17/0816* (2013.01); *G02B 13/18* (2013.01); *G02B 17/0812* (2013.01)

(58) Field of Classification Search
CPC .......................... G02B 17/0816; G02B 13/18; G02B 17/0812; G02B 13/004; G02B 13/0065; G02B 9/34
See application file for complete search history.

(56) References Cited

U.S. PATENT DOCUMENTS 5,841,574 A  *  11/1998  Willey ................. G02B 13/146
                                                    356/366
6,771,427 B1     8/2004  Matsuo
(Continued)

FOREIGN PATENT DOCUMENTS

JP    H11-212132 A    8/1999
JP    2003-075722 A   3/2003
(Continued)

OTHER PUBLICATIONS

Dec. 3, 2013 International Search Report issued in International Patent Application No. PCT/JP2013/077785.
(Continued)

*Primary Examiner* — Alicia M Harrington
(74) *Attorney, Agent, or Firm* — Oliff PLC

(57) ABSTRACT

A catadioptric photographic lens include; a first reflecting mirror, a second reflecting mirror, and a lens group, arranged in order from an object so that light reflected by the first reflecting mirror is reflected by the second reflecting mirror before passing through the lens group and forms an image of the object upon a predetermined image plane wherein; the first and the second reflecting mirror are off-center on the reference plane; reflection surfaces of the first and the second reflecting mirror are rotationally asymmetric aspheric surfaces; the reflection surface of the first reflecting mirror is concave toward the object on the reference plane and on the first orthogonal plane; and the surface closest toward the second reflecting mirror in the lens group having two lenses made from the same optical material as one another is a rotationally asymmetric aspheric surface.

10 Claims, 20 Drawing Sheets

(56) References Cited

U.S. PATENT DOCUMENTS

| | | |
|---|---|---|
| 6,908,200 B1 | 6/2005 | Yoshikawa et al. |
| 2003/0090794 A1 | 5/2003 | Chatani et al. |
| 2003/0214736 A1 | 11/2003 | Yoshikawa et al. |
| 2004/0027662 A1 | 2/2004 | Kurioka et al. |
| 2004/0114255 A1 | 6/2004 | Matsuo |
| 2004/0114256 A1 | 6/2004 | Matsuo |
| 2004/0156117 A1 | 8/2004 | Takaura et al. |
| 2004/0196568 A1 | 10/2004 | Matsuo |
| 2005/0013021 A1* | 1/2005 | Takahashi ......... G02B 17/0642 359/837 |
| 2005/0259335 A1 | 11/2005 | Nishioka |
| 2006/0077567 A1 | 4/2006 | Matsuo |
| 2006/0092385 A1 | 5/2006 | Hisada et al. |
| 2006/0126032 A1 | 6/2006 | Takaura et al. |
| 2006/0164605 A1 | 7/2006 | Kuwa |
| 2006/0198018 A1* | 9/2006 | Shafer ................ G02B 17/08 359/365 |
| 2006/0227299 A1 | 10/2006 | Hisada et al. |
| 2008/0158523 A1* | 7/2008 | Jackson ............ G02B 17/0856 353/99 |
| 2008/0304019 A1 | 12/2008 | Takaura et al. |
| 2009/0015801 A1 | 1/2009 | Takaura et al. |
| 2009/0015910 A1 | 1/2009 | Takaura et al. |
| 2009/0021703 A1 | 1/2009 | Takaura et al. |
| 2009/0237621 A1 | 9/2009 | Hisada et al. |
| 2010/0039625 A1 | 2/2010 | Takaura et al. |
| 2010/0271691 A1 | 10/2010 | Sakagami et al. |
| 2011/0038039 A1 | 2/2011 | Takaura et al. |

FOREIGN PATENT DOCUMENTS

| | | |
|---|---|---|
| JP | 2004-061959 A | 2/2004 |
| JP | 2004-258620 A | 9/2004 |
| JP | 2006-053275 A | 2/2006 |
| JP | 2006-138882 A | 6/2006 |
| JP | 2006-154720 A | 6/2006 |
| JP | 2006-292901 A | 10/2006 |
| WO | 00/48033 A1 | 8/2000 |
| WO | 01/06295 A1 | 1/2001 |
| WO | 20091060549 A1 | 5/2009 |

OTHER PUBLICATIONS

Dec. 3, 2013 Written Opinion issued in International Patent Application No. PCT/JP2013/077785.
Apr. 20, 2016 Office Action issued in Japanese Patent Application No. 2012-227559.
Sep. 4, 2017 Office Action issued in Taiwanese Application No. 102137082.
May 1, 2017 Office Action issued in Taiwanese Patent Application No. 102137082.

* cited by examiner

CATADIOPTRIC PHOTOGRAPHIC LENS

TECHNICAL FIELD

The present invention relates to a catadioptric photographic lens.

BACKGROUND ART

As a photographic lens for use with a camera, for example, a catadioptric photographic lens is per se known that is advantageous from the points of view of achieving both satisfactory correction of chromatic aberration and increased compactness. A prior art catadioptric photographic lens is an optical system that includes a concave surface reflecting mirror and a convex surface reflecting mirror arranged along a single optical axis that extends as a straight line, and that is rotationally symmetric with respect to the optical axis (for example, refer to Patent Document #1).

CITATION LIST

Patent Literature

Patent Document #1: Japanese Laid-Open Patent Publication Heisei 11-212132.

SUMMARY OF INVENTION

Technical Problem

With such a prior art catadioptric photographic lens, after the central portion of a light flux from an object (i.e. from a photographic subject) has been intercepted by the convex surface reflecting mirror, the light flux is reflected in order by the concave surface reflecting mirror that has a central opening portion and thus reflected by the convex surface reflecting mirror, and finally arrives at an image plane via the opening portion of the concave surface reflecting mirror. As a result, the central portion of the focused light flux that has reached the image plane is missing, and defocusing (positional deviation of the focal point) with respect to the image plane can easily cause annular blurring in the object image.

The present invention has been conceived in consideration of the problem described above, and provides a catadioptric photographic lens that does not cause the annular blurring originating from defocusing.

Solution to Technical Problem

According to the 1st aspect of the present invention, a catadioptric photographic lens comprises, is first reflecting mirror, a second reflecting mirror, and a lens group, which are arranged in order from an object so that light reflected by the first reflecting mirror is reflected by the second reflecting mirror before passing through the lens group and forms an image of the object upon a predetermined image plane, wherein, when a straight line that is extended between a center of the object and a center of the first reflecting mirror is defined as a first reference axis; a straight line that is extended between a center of the second reflecting mirror and a center of the image plane is defined as a second reference axis; a plane including the first reference axis and the second reference axis is defined as a reference plane; a plane passing through the center of the first reflecting mirror, perpendicular to the reference plane, and subtending a predetermined angle with respect to the first reference axis is defined as a first orthogonal plane; a plane passing through the center of the second reflecting mirror, perpendicular to the reference plane, and subtending a predetermined angle with respect to the second reference axis is defined as a second orthogonal plane; and a plane passing through a center of a surface of the lens group that is closest toward the second reflecting mirror, perpendicular to the reference plane, and parallel to the second reference axis is defined as a third orthogonal plane: the first reflecting mirror and the second reflecting mirror are off-center on the reference plane; a reflection surface of the first reflecting mirror is a rotationally asymmetric aspheric surface, and has a shape that is concave toward the object on the reference plane and on the first orthogonal plane; a reflection surface of the second reflecting mirror is a rotationally asymmetric aspheric surface; the surface in the lens group closest toward the second reflecting mirror is a rotationally asymmetric aspheric surface; and the lens group has two lenses that are made from the same optical material as one another.

According to the 2nd aspect of the present invention, it is preferred that in the catadioptric photographic lens of the 1st aspect, the two lenses have incident surfaces and exit surfaces having rotationally asymmetric aspheric surface shapes.

According to the 3rd aspect of the present invention, it is preferred that in the catadioptric photographic lens of the 2nd aspect, the two lenses are arranged so that a tangent plane to the incident surface formed in the aspheric surface shape of the first lens towards the second reflecting mirror, and a tangent plane to the incident surface formed in the aspheric surface shape of the second lens towards the image plane, define a slant downwards shape on the reference plane.

According to the 4th aspect of the present invention, it is preferred that in the catadioptric photographic lens of the 3rd aspect, a first angle of inclination that the tangent plane to the incident surface formed in the aspheric surface shape of the first lens subtends on the reference plane with respect to a plane orthogonal to the second reference axis, and a second angle of inclination that the tangent plane to the incident surface formed in the aspheric surface shape of the second lens subtends on the reference plane with respect to a plane orthogonal to the second reference axis, are greater than 5° and less than 65°.

According to the 5th aspect of the present invention, it is preferred that in the catadioptric photographic lens of the 3rd or 4th aspect, a first wedge angle that the tangent plane to the incident surface formed in the aspheric surface shape of the first lens and the tangent plane to the exit surface formed in the aspheric surface shape of the first lens subtend on the reference plane, and a second wedge angle that the tangent plane to the incident surface formed in the aspheric surface shape of the second lens and the tangent plane to the exit surface formed in the aspheric surface shape of the second lens subtend on the reference plane, are smaller than 35°.

According to the 6th aspect of the present invention, it is preferred that in the catadioptric photographic lens of any one of the 1st through 5th aspects, the two lenses have meniscus shapes on the third orthogonal plane.

According to the 7th aspect of the present invention, in the catadioptric photographic lens of any one of the 1st through 6th aspect, a plane of the object and the image plane may be parallel.

According to the 8th aspect of the present invention, the catadioptric photographic lens of any one of the 1st through 7th aspects may further comprise a protective lens disposed on the first reflecting mirror toward the object, and having an optical surface formed in a rotationally asymmetric aspheric surface shape.

Advantageous Effects of Invention

With the catadioptric photographic lens of the present invention, since the object image is formed by a light flux of solid cross section in which the central portion is not missing, accordingly annular blurring originating in defocusing does not occur, so that a clear object image is obtained.

DESCRIPTION OF EMBODIMENTS

Before the explanation of the embodiment in concrete terms, the mechanism of aberration correction in the present invention will be explained. While the present invention relates to an image focusing lens that is used in the visible region, for example a camera lens that has a comparatively long focal length, it employs a catadioptric optical system in order to correct chromatic aberration. It is more difficult to correct chromatic aberration with a lens of long focal length. That is to say, while correction of chromatic aberration is also very important for lenses of short focal length, the correction of secondary chromatic aberration is a particular problem in the case of long focal length.

While it is beneficial to use two or more types of optical material having different dispersions in order to achromatize two colors, it is necessary to utilize a greater number of types of optical material in an optical system of long focal length in order to perform achromatization over a broad wavelength such as the visible region. However the use of a greater number of types of optical material increases in the number of lenses, and finally causes the problems of increase in the weight of the optical system, increase in its size, and increase in its cost. Thus, with the present invention, a pair of reflecting mirrors are used in order to correct chromatic aberration (in particular, secondary chromatic aberration).

Although chromatic aberration does not occur with a reflecting mirror, a portion of the right flux is shielded by a pair of reflecting mirrors arranged in sequence along a common axis in a straight line configuration. Due to this, the pair of reflecting mirrors are arranged off-center in order to avoid shielding of the light flux. When the pair of reflecting mirrors are arranged off-center, this off-center arrangement leads to new aberration. In other words, the problem of chromatic aberration correction is solved by utilizing reflecting mirrors, but since the off-center arrangement is required for the pair of reflecting mirrors, accordingly the problem of correcting chromatic aberration is replaced by the problem of correcting off-center aberration. With the present invention, this problem of correction of off-center aberration is solved by employing optical surfaces of the so-called free curved surface type, and finally an optical system that has high image focusing performance in which aberration is corrected can be provided.

Figure 1:
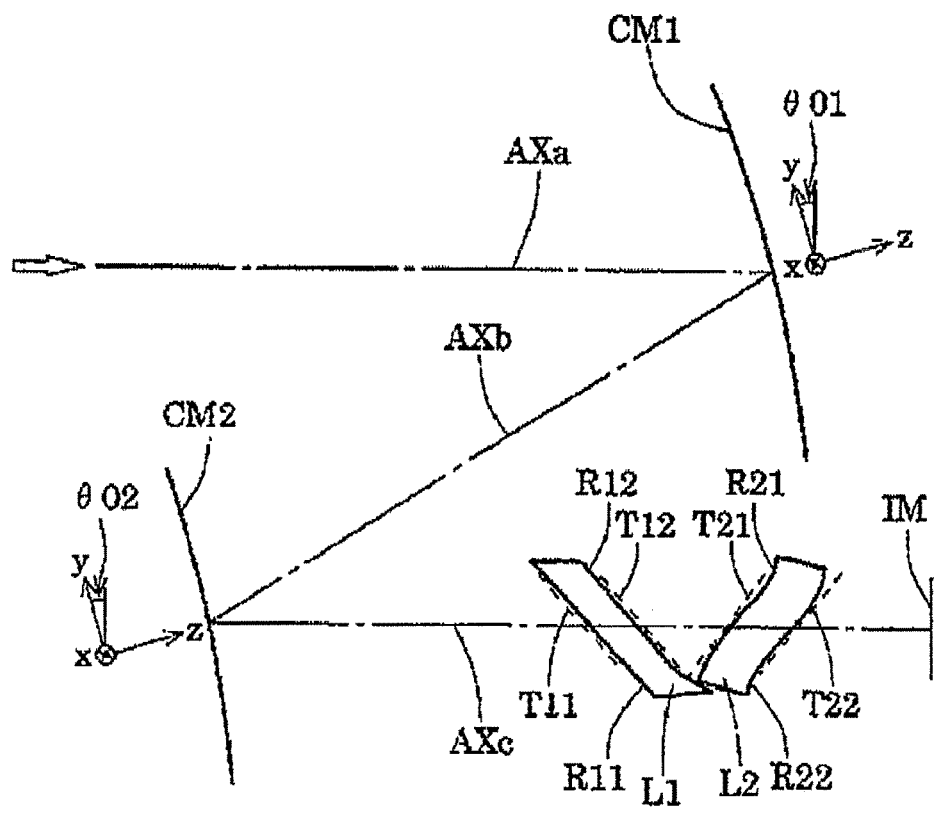
FIG. 1 is a figure schematically showing the basic structure of various catadioptric photographic lenses according to specific examples of the present embodiment.
Figure 1:
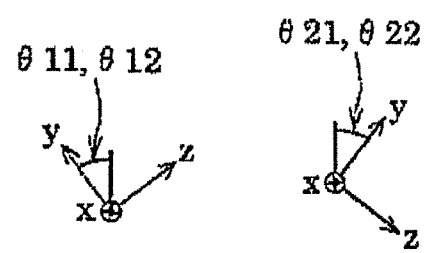
Figure 1:
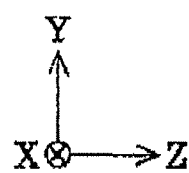

In the following, the embodiment will be explained on the basis of the appended drawings. FIG. 1 is a figure schematically showing the basic structure of a catadioptric photographic lens according to these examples of the embodiment. The catadioptric photographic lens according to the various examples is, for example, a photographic lens to be used for a camera, and comprises, as shown in FIG. 1, in order of the incident light from the object side, a first reflecting mirror CM1, a second reflecting mirror CM2, and a lens group (L1, L2) that includes two lenses L1 and L2. Moreover, in the sixth example, a protective lens L0 disposed on the object side of the first reflecting mirror CM1 (refer to FIG. 18).

In FIG. 1, the reference axis AXa (the "first reference axis") is a straight line extended between the center of an object that is at infinity and the center of the first reflecting mirror CM1 (i.e. the origin of its reflection surface). The reference axis AXb is a straight line extended between the center of the first reflecting mirror CM1 and the center of the second reflecting mirror CM2 (i.e. the origin of its reflection surface). And the reference axis AXc (the "second reference axis") is a straight line extended between the center of the second reflecting mirror CM2 and the center of the image plane IM. In FIG. 1, an X axis perpendicular to the drawing paper in FIG. 1, a Y axis in the vertical direction along the drawing paper, and a Z axis in the horizontal direction along the drawing paper are set as an overall coordinate system (X,Y,Z). Moreover, in each of the examples, the reference axis AXa extends along the Z axis, i.e. in the horizontal direction.

Each of the reference axes AXa, AXb, and AXc extends as a straight line along the drawing paper (in the Y-Z plane) in FIG. 1. In other words, although the reference axes AXa through AXc have a zigzag form in cross sectional structure in the Y-Z plane, they appear to be overlapped as a single straight line in cross sectional structure in the X-Z plane. The object plane and the image plane IM are parallel. In the following, the plane that includes the reference axis AXa and the reference axis AXc, in other words the Y-Z plane, will be termed the "reference plane".

In FIG. 1, local coordinate systems (x,y,z) are set for each of the first reflecting mirror CM1, the second reflecting mirror CM2, and the lenses L1 and L2. In the local coordinate system of the first reflecting mirror CM1, the x axis is set to be parallel to the X axis, the y-z plane is set so as to coincide with the Y-Z plane, and the y axis and a direction obtained by rotating the Y axis through just an angle θ01 anticlockwise are coincident. In other words, the magnitude of the angle subtended by the y axis of the local coordinate system of the first reflecting mirror CM1 with respect to the Y axis of the overall coordinate system is θ01.

And, in the local coordinate system of the second reflecting mirror CM2, the x axis is set to be parallel to the X axis, the y-z plane is set so as to coincide with the Y-Z plane, and the y axis and a direction obtained by rotating the Y axis through just an angle θ02 anticlockwise are coincident. In other words, the magnitude of the angle subtended by the y axis of the local coordinate system of the second reflecting mirror CM2 with respect to the Y axis of the overall coordinate system is θ02. In all of the specific examples, the magnitudes of these angles θ01 and θ02 are the same.

Moreover, in the local coordinate system of the incident surface R11 of the lens L1, the x axis is set to be parallel to the X axis, the x-y plane is set so as to coincide with the tangent plane T11 to the incident surface R11, and the y-z plane is set so as to coincide with the Y-Z plane. And the magnitude of the angle subtended by the y axis of the local coordinate system of the incident surface R11 with respect to the Y axis of the overall coordinate system is θ11. Furthermore, in the local coordinate system of the exit surface R12 of the lens L1, the x axis is set to be parallel to the X axis, the x-y plane is set so as to coincide with the tangent plane T12 to the exit surface R12, and the y-z plane is set so as to coincide with the Y-Z plane. And the magnitude of the angle subtended by the y axis of the local coordinate system of the exit surface R12 with respect to the Y axis of the overall coordinate system is θ12.

Yet further, in the local coordinate system of the incident surface R21 of the lens L2, the x axis is set to be parallel to the X axis, the x-y plane is set so as to coincide with the tangent plane T21 to the incident surface R21, and the y-z plane is set so as to coincide with the Y-Z plane. And the magnitude of the angle subtended by the y axis of the local coordinate system of the incident surface R21 with respect to the Y axis of the overall coordinate system is θ21. Furthermore, in the local coordinate system of the exit surface R22 of the lens L2, the x axis is set to be parallel to the X axis, the x-y plane is set so as to coincide with the tangent plane T22 to the exit surface R22, and the y-z plane is set so as to coincide with the Y-Z plane. And the magnitude of the angle subtended by the y axis of the local coordinate system of the exit surface R22 with respect to the Y axis of the overall coordinate system is θ22.

The image plane IM is a plane that is parallel to the X-Y plane. And, while this feature is not shown in FIG. 1, in the sixth example, in the local coordinate system of the incident surface of the protective lens L0 that is disposed on the object side of the first reflecting mirror CM1, the x axis, the y axis, and the z axis are set to be respectively parallel to the X axis, the Y axis, and the Z axis (refer to FIG. 18). In other words, the magnitude of the angle subtended by the y axis of the local coordinate system of the incident surface of the protective lens L0 with respect to the Y axis of the overall coordinate system is zero. In a similar manner, in the local coordinate system of the exit surface of the protective lens L0, the x axis, the y axis, and the z axis are set to be respectively parallel to the X axis, the Y axis, and the Z axis. In other words, the magnitude of the angle subtended by the y axis of the local coordinate system of the exit surface of the protective lens L0 with respect to the Y axis of the overall coordinate system is zero.

The reflection surface of the first reflecting mirror CM1 is a rotationally asymmetric aspheric surface, and has a shape that is concave toward the object side on the reference plane and on the x-z plane (i.e. the first orthogonal plane) that is perpendicular to the reference plane. And the reflection surface of the second reflecting mirror CM2, the incident surface R11 and the exit surface R12 of the lens L1, and the incident surface R21 and the exit surface R22 of the lens L2 are rotationally asymmetric aspheric surfaces. Moreover, in the sixth example, the incident surface and the exit surface of the protective lens L0 that is disposed on the object side of the first reflecting mirror CM1 are also rotationally asymmetric aspheric surfaces (refer to FIG. 18).

In this manner, the first reflecting mirror CM1 and the second reflecting mirror CM2 are positioned off-center on the reference plane, so that, light reflected by the first reflecting mirror CM1 has been reflected by the second reflecting mirror CM2 before passing through the lenses L1 and L2 forms an object image upon the image plane IM. To put this in another manner, the first reflecting mirror CM1 and the second reflecting mirror CM2 are positioned off-center, so that the central portion of the light flux from the object is not blocked but arrives at the image plane IM, and furthermore so that the light flux of solid cross section with no central portion missing forms the object image upon the image plane IM.

The rotationally asymmetric aspheric surfaces (that is free curved surface) of the first reflecting mirror CM1, the second reflecting mirror CM2, and the lenses L0, L1, and L2 are prescribed according to the following Equation (1). In Equation (1), s is the amount of sag of the aspheric surface in the z direction (units mm), m and n are positive integers or zero, and C(m,n) is the coefficient of the monomial $x^m \cdot y^n$.

Equation (1)

$$s = \sum_m \cdot \sum_n \{C(m, n) \cdot x^m \cdot y^n\} \quad (1)$$

In this embodiment, while no chromatic aberration is generated by the reflecting mirrors, the pair of reflecting mirrors CM1 and CM2 are arranged off-center in the reference plane (i.e. in the Y-Z plane) in order to avoid shielding of light. In this case, not only is there no generation of off-center aberration, but also a mechanical limitation is imposed upon the arrangement of the reflecting mirrors CM1 and CM2. In this embodiment, it is possible to make the system more compact while still correcting aberration, in condition that the number of reflecting mirrors making mechanical arrangement complicated is restricted to two and two lenses having optical surfaces of the free curved surface are added.

A lens having an optical surface of the free curved surface is processed by employing a cutting or grinding machine that is highly controlled. Due to this, the processing takes a long time, and the processing machine itself is expensive. Accordingly, for manufacturing a lens having an optical surface of the free curved surface at a comparatively cheap price and moreover in high volume, it is necessary to provide a mold that has been processed at high accuracy, and to employ a technique such as injection molding with resin or glass molding or the like. Due to this, there are limitations upon the optical material that can be used for such a lens having an optical surface of the free curved surface. On the other hand, while chromatic aberration is usually generated with a lens, it is necessary to employ optical materials of a plurality of types having different dispersions in order to correct chromatic aberration.

In the following examples, the reflecting mirrors CM1 and CM2 are made to have comparatively high power, whereas the lenses L1 and L2 are kept down to comparatively low power, and the lenses L1 and L2 principally fulfill the function of aberration correction. Furthermore, by mutual correction of the chromatic aberration generated by the lenses L1 and L2, chromatic aberration can be satisfactorily corrected, irrespective of the fact that those two lenses are made from the same optical material. It should be understood that, since only one type of optical material is used, accordingly it is possible to find out a single set of processing conditions for the lenses, so that it is possible to anticipate reduction of the time period for processing and reduction of the cost and so on.

In this manner, with the catadioptric photographic lens according to each example of this embodiment, not only is it possible to anticipate greatly increasing the compatibility between performing satisfactory correction of chromatic aberration and making the lens compact, but also the light flux that forms the object image has a solid cross section with no missing central portion. As a result, there is no occurrence of annular blurring originating in defocusing, and it is possible to obtain a more natural object image.

The catadioptric photographic lens according to this embodiment is asymmetric on the reference plane (the Y-Z plane). In this case, since aberration is generated due to primary chromatic aberration of the pupil coordinates and a lot of chromatic aberration of the odd number orders is generated larger, and it is necessary to correct this chromatic aberration in a satisfactory manner. On the other hand, while it is necessary to suppress the generation of chromatic aberration for a pair of lenses L1 and L2 that are made from the same type of optical material, it is difficult for chromatic aberration of the even numbered orders to be generated in a manner of keeping the power of the lenses L1 and L2 low, which is advantageous for correction of chromatic aberration. Since, in the various examples, it is necessary to keep the power low, accordingly the correction of chromatic aberration of the odd numbered orders is anticipated by tilting the lenses L1 and L2.

In concrete terms, in the examples, with the two lenses L1 and L2, the tangent plane T11 to the incident surface R11 of the aspheric surface shape of the first lens L1 on the side toward the second reflecting mirror CM2 and the tangent plane T21 to the incident surface R21 of the aspheric surface shape of the second lens L2 on the side toward the image plane IM are arranged so as to form a slant downwards shape (or a slant shape) on the reference plane (i.e. the Y-Z plane). Since the lenses L1 and L2 are inclined in this manner, chromatic aberration of odd numbered orders is generated by each of the lenses. However, since the lens L1 and the lens L2 are inclined in directions that are mutually opposite, accordingly it is possible for their respective chromatic aberrations mutually to cancel one another out, and it is possible to suppress shifting of the image in accordance with wavelength.

Moreover, in each of the examples, the magnitude of the angle that the tangent plane T11 to the incident surface R11 of the aspheric surface shape of the first lens L1 subtends on the reference plane (the Y-Z plane) with respect to a plane (the X-Y plane) orthogonal to the second reference axis AXc, in other words the first angle of inclination $\theta 11$, and the magnitude of the angle that the tangent plane T21 to the incident surface R21 of the aspheric surface shape of the second lens L2 subtends on the reference plane with respect to a plane orthogonal to the second reference axis AXc, in other words the second angle of inclination $\theta 21$, are greater than 5° and less than 65°. If the first angle of inclination $\theta 11$ and the second angle of inclination $\theta 21$ are less than or equal to 5°, then it becomes difficult to perform sufficient correction of chromatic aberration. On the other hand, if the first angle of inclination $\theta 11$ and the second angle of inclination $\theta 21$ are greater than or equal to 65°, then, even though the function for correction of chromatic aberration is not much deteriorated, it becomes difficult to provide the necessary space for arranging the lenses.

In each of the examples, the magnitude of the angle that the tangent plane T11 to the incident surface R11 of the aspheric surface shape of the first lens T11 and the tangent plane T12 to the exit surface R12 of the aspheric surface shape of the first lens T12 subtend on the reference plane (the Y-Z plane) is defined as a first wedge angle $\Delta 1$ ($\Delta 1 = |\theta 11 - \theta 12|$). Moreover, the magnitude of the angle that the tangent plane T21 to the incident surface R21 of the aspheric surface shape of the second lens T21 and the tangent plane T22 to the exit surface R22 of the aspheric surface shape of the second lens T22 subtend on the reference plane is defined as a second wedge angle $\Delta 2$ ($\Delta 2 = |\theta 21 - \theta 22|$). The first wedge angle $\Delta 1$ and the second wedge angle $\Delta 2$ are less than 35°.

From the standpoint of aberration correction, it is desirable for the first wedge angle Δ1 and the second wedge angle Δ2 to be as small as possible, as in the case of the first through the third examples. However even if, as in the fourth example and the fifth example, the first wedge angle Δ1 and the second wedge angle Δ2 are set to be somewhat greater within the range less than 35°, then the aberration generated by this increase in the first wedge angle Δ1 and the second wedge angle Δ2 can be corrected by optical surfaces that are curved on the y-z plane.

Moreover, in each of the examples, the two lenses L1 and L2 have meniscus shapes on the third orthogonal plane (the X-Z plane). In other words while the optical surfaces in the two lenses L1 and L2 have comparatively large curvatures on the third orthogonal plane, they only have comparatively small power as lenses. With this structure, in the two lenses L1 and L2, it is possible to cancel out the chromatic aberration generated by the incident surface with the chromatic aberration generated by the exit surface.

Example #1

Figure 2:
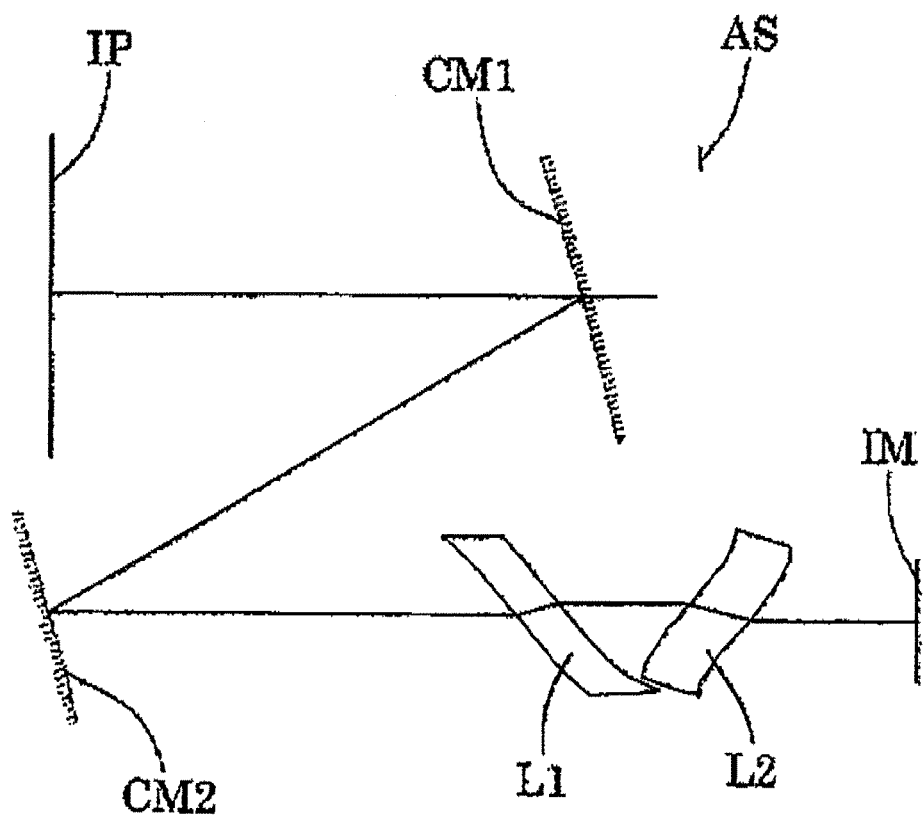
FIG. 2 is a figure schematically showing the cross sectional structure of a catadioptric photographic lens according to a first specific example, taken in the Y-Z plane.
Figure 2:
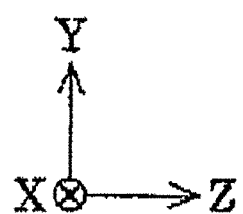
Figure 3:
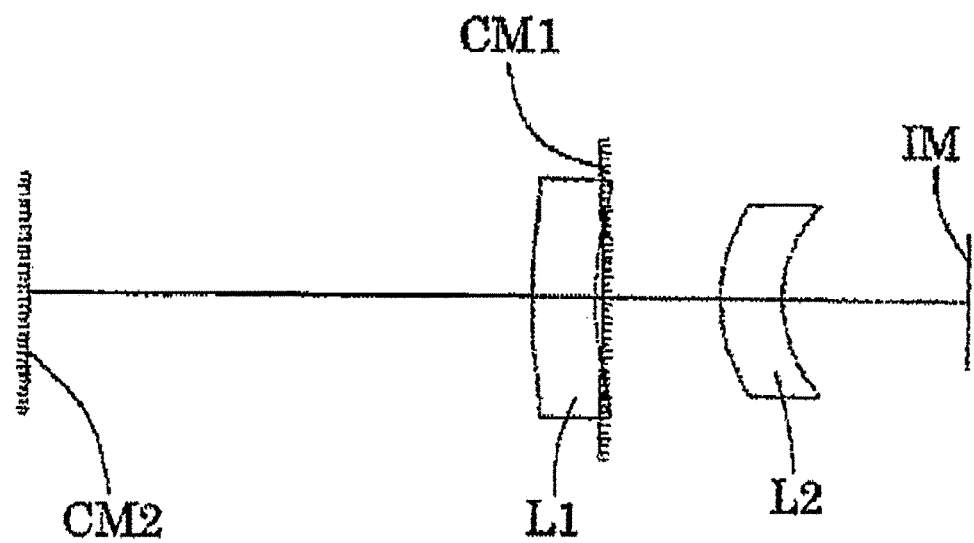
FIG. 3 is a figure schematically showing the cross sectional structure of this catadioptric photographic lens according to the first specific example, taken in the X-Z plane.
Figure 3:
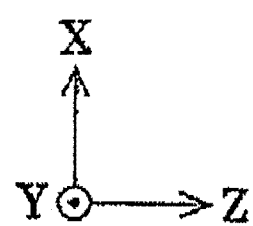

FIG. 2 is a figure schematically showing the cross sectional structure of a catadioptric photographic lens according to a first example, taken in the Y-Z plane. And FIG. 3 is a figure schematically showing the cross sectional structure of this catadioptric photographic lens according to the first example, taken in the X-Z plane. In all of the example including this first example, it would be possible to dispose an iris aperture AS on the optical path between the first reflecting mirror CM1 and the second reflecting mirror CM2. In FIG. 2 and FIGS. 6, 9, 12, 15, and 18 that correspond thereto, in order to make the drawing clearer, the aperture of the iris AS is shown as being disposed upon the optical path of light virtually transmitted through the first reflecting mirror CM1, instead of upon the optical path of light reflected by the first reflected mirror CM1.

Furthermore, in the first through the fifth examples, it would be possible to dispose a parallel plane plate as a protective glass member at the position shown by the reference symbol IP, more toward the object side than the first reflecting mirror CM1. As described above, in the examples, the lens L1 and the lens L2 are made from the same optical material as one another. And in the first example, as shown in FIG. 3, the lenses L1 and L2 have meniscus shapes on the third orthogonal plane (i.e. the X-Z plane). The values of the specifications of the catadioptric photographic lens according to the first example are given in the following Table 1.

In the region "glass material data" in Table (1), ne is the refractive index of the optical material for the e line (the standard wavelength of 546.1 nm), while νe is the standard Abbe number for the e line. And in the region "optical member specifications" in Table (1), the surface numbers denote the order of the surfaces from the object side along the path of progression of light from an object that is at infinity to the image plane IM. In other words, the first surface is the reflection surface of the first reflection mirror CM1, the second surface is the reflection surface of the second reflecting mirror CM2, the third surface is the incident surface R11 of the lens L1, the fourth surface is the exit surface R12 of the lens L1, the fifth surface is the incident surface R21 of the lens L2, the sixth surface is the exit surface of the lens L2, and the seventh surface is the image plane IM.

Moreover, in the region "optical member specifications" in Table (1), there are given the X coordinate (units: mm), the Y coordinate (units: mm), and the Z coordinate (units: mm) of the origin of the local coordinate system (x,y,z) for the surfaces, and the angle of inclination δ of the y axis with respect to the Y axis (unit: degrees). It will be supposed that this angle of inclination δ has a positive value when, on the drawing paper of the corresponding figure, the direction of the Y axis rotated anticlockwise through an acute angle and the y axis agree with one another, and has a negative value when the direction of the Y axis rotated clockwise through an acute angle and the y axis agree with one another.

Accordingly, referring to FIG. 1 and FIG. 2, the angle of inclination δ of the local coordinate system (x,y,z) at the reflection surface of the first reflecting mirror CM1, which is the first surface, is θ01 which has a positive value. And the angle of inclination δ of the local coordinate system (x,y,z) at the reflection surface of the second reflecting mirror CM2, which is the second surface, is θ02 which has a positive value. Moreover, the angle of inclination δ of the local coordinate system (x,y,z) at the incident surface R11 of the lens L1, which is the third surface, is θ11, which has a positive value.

And the angle of inclination δ of the local coordinate system (x,y,z) at the exit surface R12 of the lens L1, which is the fourth surface, is θ12 which has a positive value. Moreover, the angle of inclination δ of the local coordinate system (x,y,z) at the incident surface R21 of the lens L2, which is the fifth surface, is θ21 which has a negative value. And the angle of inclination δ of the local coordinate system (x,y,z) at the exit surface R22 of the lens L2, which is the sixth surface, is θ22 which has a negative value.

In the region "aspheric surface data" in Table (1), various parameters of Equation (1) are given that define the rotationally asymmetric aspheric surfaces (i.e. the free curved surfaces) of the first reflecting mirror CM1, of the second reflecting mirror CM2, and the group of the lenses L1 and L2. It should be understood that the headings in Table (1) are also the same in the cases of Tables (2) through (6) described subsequently. The region for glass material data in Table (1) is common to the other examples described, and in Tables (2) through (6) duplicated description is omitted.

TABLE 1

<glass material data>

| | Ne | νe |
|---|---|---|
| glass material | 1.518722 | 64.0 |

<optical member specifications>

| surface number | X coordinate | Y coordinate | Z coordinate | inclination angle δ | |
|---|---|---|---|---|---|
| 1 | 0 | 0.00 | 182.37 | 15.33 | (CM1) |
| 2 | 0 | −110.06 | −0.45 | 15.33 | (CM2) |
| 3 | 0 | −108.25 | 159.93 | 40.55 | (L1; R11) |
| 4 | 0 | −111.85 | 174.92 | 40.55 | (L1; R12) |
| 5 | 0 | −103.83 | 220.08 | −40.08 | (L2; R21) |
| 6 | 0 | −110.26 | 240.72 | −40.08 | (L2; R22) |
| 7 | 0 | −108.74 | 300.00 | 0.00 | (IM) |

<aspheric surface data>

| surface number | 1 4 | 2 5 | 3 6 |
|---|---|---|---|
| $C(2, 0)$ | −4.5485E−04 7.5032E−03 | 1.2778E−04 1.1904E−02 | 4.0423E−03 1.6197E−02 |
| $C(1, 1)$ | 0.0000E+00 0.0000E+00 | 0.0000E+00 0.0000E+00 | 0.0000E+00 0.0000E+00 |

TABLE 1-continued

| | | | |
|---|---|---|---|
| C(0, 2) | −5.4426E−04 | −2.0370E−04 | 1.7881E−05 |
| | 8.5289E−04 | 5.3203E−04 | −3.2559E−04 |
| C(3, 0) | 0.0000E+00 | 0.0000E+00 | 0.0000E+00 |
| | 0.0000E+00 | 0.0000E+00 | 0.0000E+00 |
| C(1, 2) | 1.0189E−06 | 6.4645E−06 | −1.9862E−04 |
| | −1.3519E−04 | −2.5274E−04 | −2.9753E−04 |
| C(2, 1) | 0.0000E+00 | 0.0000E+00 | 0.0000E+00 |
| | 0.0000E+00 | 0.0000E+00 | 0.0000E+00 |
| C(0, 3) | 4.0475E−07 | 2.3828E−06 | −8.6614E−06 |
| | −4.3536E−05 | −4.1322E−05 | −2.9955E−05 |
| C(4, 0) | 1.8979E−09 | 1.0681E−08 | −8.9615E−07 |
| | −1.1465E−06 | 2.0235E−06 | 3.8480E−06 |
| C(3, 1) | 0.0000E+00 | 0.0000E+00 | 0.0000E+00 |
| | 0.0000E+00 | 0.0000E+00 | 0.0000E+00 |
| C(2, 2) | 3.4973E−09 | 3.5714E−08 | −6.7566E−06 |
| | −1.0851E−05 | 1.9185E−06 | 2.6397E−06 |
| C(1, 3) | 0.0000E+00 | 0.0000E+00 | 0.0000E+00 |
| | 0.0000E+00 | 0.0000E+00 | 0.0000E+00 |
| C(0, 4) | 1.1898E−09 | 1.4192E−08 | −7.9287E−08 |
| | 1.5370E−06 | 1.2697E−06 | 1.0925E−06 |
| C(5, 0) | 0.0000E+00 | 0.0000E+00 | 0.0000E+00 |
| | 0.0000E+00 | 0.0000E+00 | 0.0000E+00 |
| C(4, 1) | 1.2896E−11 | −1.9348E−11 | −1.2712E−08 |
| | −5.9738E−08 | −4.6920E−08 | −1.0018E−07 |
| C(3, 2) | 0.0000E+00 | 0.0000E+00 | 0.0000E+00 |
| | 0.0000E+00 | 0.0000E+00 | 0.0000E+00 |
| C(2, 3) | 1.8895E−11 | 1.4868E−10 | 1.0808E−07 |
| | 1.9384E−07 | −1.2487E−07 | −1.6485E−07 |
| C(1, 4) | 0.0000E+00 | 0.0000E+00 | 0.0000E+00 |
| | 0.0000E+00 | 0.0000E+00 | 0.0000E+00 |
| C(0, 5) | 1.2620E−11 | 4.1668E−10 | −1.8870E−08 |
| | −2.5147E−08 | −7.0869E−08 | −8.9725E−08 |
| C(6, 0) | 2.7729E−14 | 3.2753E−13 | −2.7671E−10 |
| | −5.3653E−10 | −4.7029E−10 | −2.0790E−09 |
| C(5, 1) | 0.0000E+00 | 0.0000E+00 | 0.0000E+00 |
| | 0.0000E+00 | 0.0000E+00 | 0.0000E+00 |
| C(4, 2) | −3.1061E−14 | −5.1674E−12 | 5.2151E−09 |
| | 8.4118E−09 | 1.6619E−09 | 2.9180E−09 |
| C(3, 3) | 0.0000E+00 | 0.0000E+00 | 0.0000E+00 |
| | 0.0000E+00 | 0.0000E+00 | 0.0000E+00 |
| C(2, 4) | 7.1280E−14 | −1.8900E−12 | −2.9271E−10 |
| | −5.9684E−10 | 4.0774E−09 | 8.9811E−09 |
| C(1, 5) | 0.0000E+00 | 0.0000E+00 | 0.0000E+00 |
| | 0.0000E+00 | 0.0000E+00 | 0.0000E+00 |
| C(0, 6) | 1.2422E−14 | −4.1081E−12 | 9.8721E−12 |
| | −1.5356E−10 | −2.7018E−09 | −2.7216E−09 |
| C(7, 0) | 0.0000E+00 | 0.0000E+00 | 0.0000E+00 |
| | 0.0000E+00 | 0.0000E+00 | 0.0000E+00 |
| C(6, 1) | −3.7287E−16 | −2.3531E−14 | 3.6878E−11 |
| | 3.2960E−11 | 7.9192E−11 | 2.8234E−10 |
| C(5, 2) | 0.0000E+00 | 0.0000E+00 | 0.0000E+00 |
| | 0.0000E+00 | 0.0000E+00 | 0.0000E+00 |
| C(4, 3) | −1.4557E−15 | −6.9529E−14 | −3.1498E−11 |
| | −1.0446E−10 | 5.5218E−11 | −3.6164E−11 |
| C(3, 4) | 0.0000E+00 | 0.0000E+00 | 0.0000E+00 |
| | 0.0000E+00 | 0.0000E+00 | 0.0000E+00 |
| C(2, 5) | −3.8312E−16 | −1.0126E−13 | −1.3421E−11 |
| | −9.3971E−12 | 8.7879E−11 | 8.9466E−11 |
| C(1, 6) | 0.0000E+00 | 0.0000E+00 | 0.0000E+00 |
| | 0.0000E+00 | 0.0000E+00 | 0.0000E+00 |
| C(0, 7) | 5.2044E−16 | 5.8662E−14 | −3.6216E−12 |
| | 1.6519E−12 | −6.6089E−11 | −7.5726E−11 |

<values corresponding to conditions>

Figure 4:
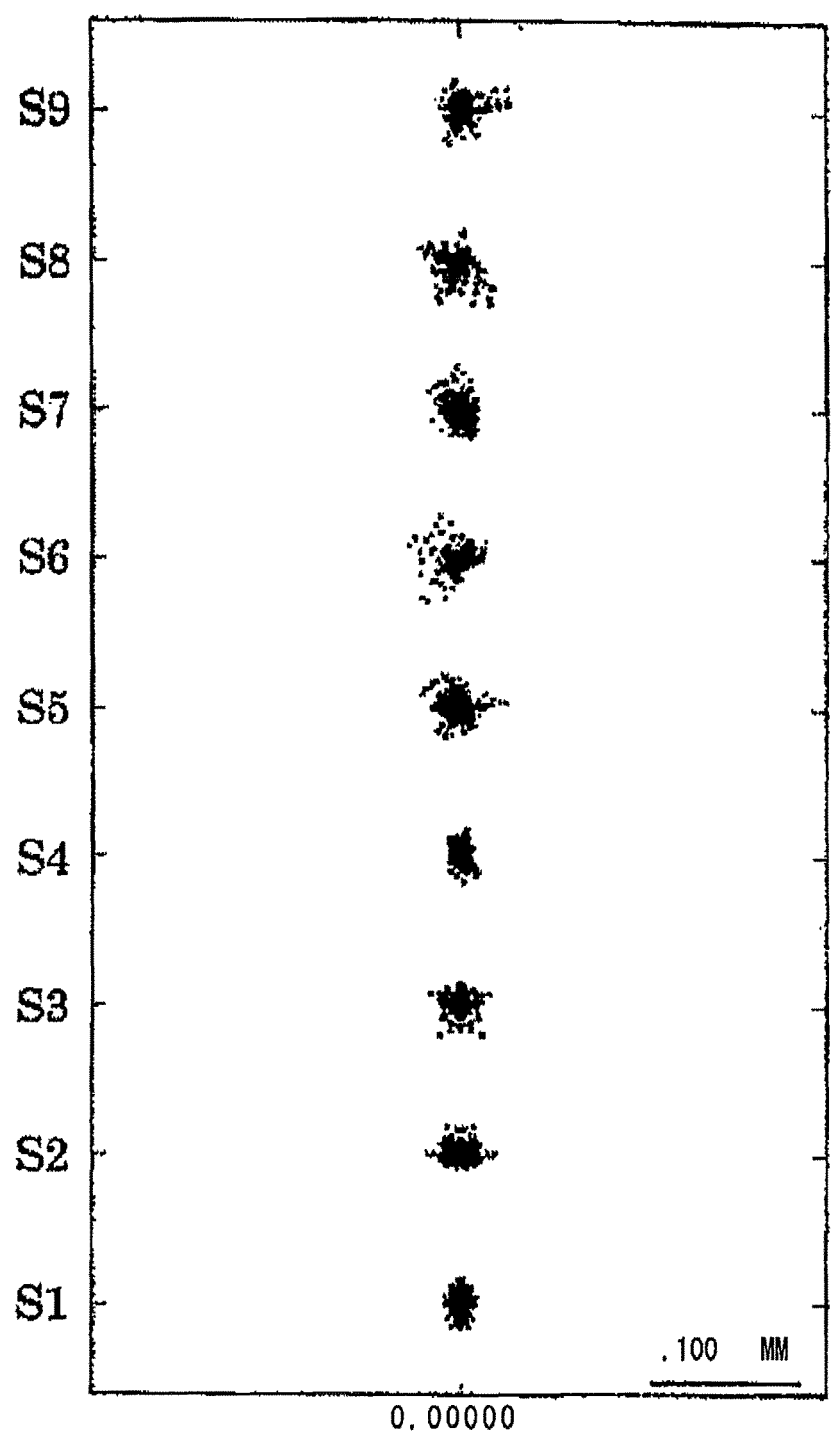
FIG. 4 is a figure showing aberration in this first specific example for the g line, for the e line, and for the C line, as spot diagrams.
Figure 5:
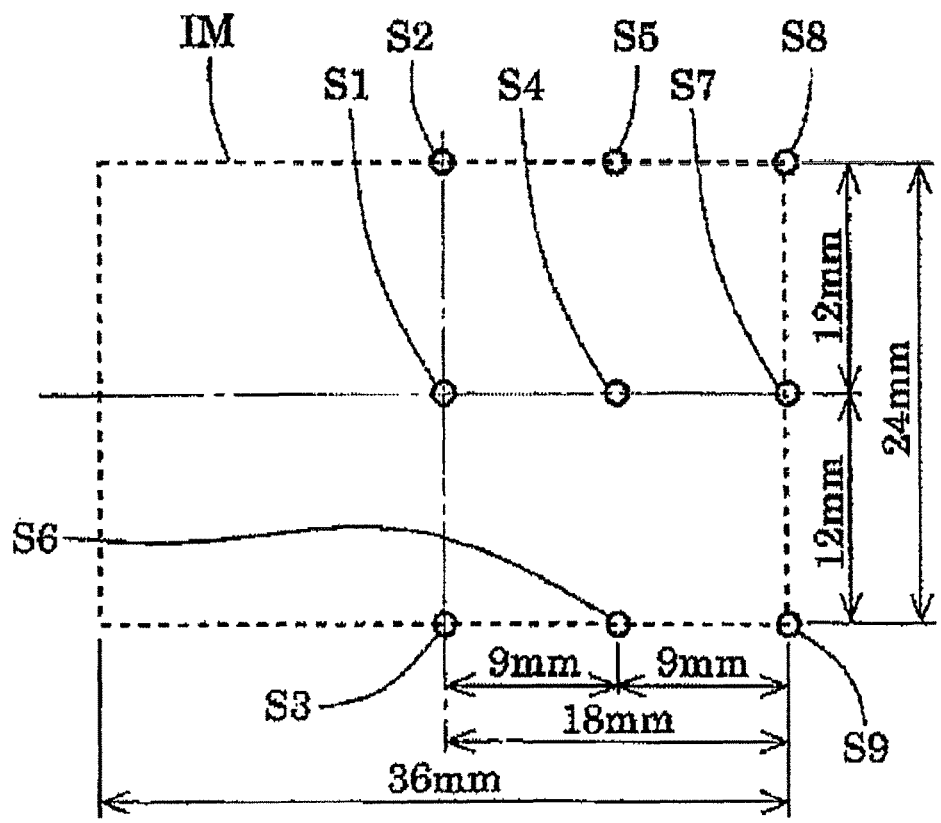
FIG. 5 is a figure showing the positions of nine image points for the spot diagrams of the various specific examples.

$\theta 11$ = 40.55 degrees
$\theta 12$ = 40.55 degrees
$\theta 21$ = 40.08 degrees
$\theta 22$ = 40.08 degrees
$\Delta 1$ = |$\theta 11 - \theta 12$| = 0 degree
$\Delta 2$ = |$\theta 21 - \theta 22$| = 0 degree FIG. 4 is a figure showing aberration in this first example for the g line, for the e line, and for the C line, as spot diagrams. In FIG. 4, the spot for the g line (wavelength: 435.8 nm), the spot for the e line, and the spot for the C line (wavelength: 656.3 nm) are weighted with weightings 1:1:1. This description of FIG. 4 also applies to FIG. 8, FIG. 11, FIG. 14, FIG. 17, and FIG. 20. Moreover, FIG. 5 is a figure showing the positions of the nine image points for the spot diagrams of the various examples. The e line is the standard wavelength for this embodiment, the g line is the shortest wavelength when designing a typical visible optical system, and the C line is the longest wavelength when designing a typical visible optical system.

The dispersion originated from the refractive index of the glass material is higher at shorter wavelengths, and the g line is the line for which the greatest amount of chromatic aberration is generated. In the examples a digital camera of the FX format is assumed, and, as shown in FIG. 5, spots are calculated at nine image points (viewpoints) S1 through S9 on the image plane IM, which is shaped as a 36 mm×24 mm rectangle. The scale of units in FIG. 4 is 0.1 mm=100 μm. Referring to FIG. 4 it will be understood that in the first example, the size of the spot at each of the image points S1 through S9 is satisfactorily small, and that aberration has been corrected uniformly and well over the entire image plane IM. Moreover it will be understood that the shape of the spot for each of the image points S1 through S9 is almost symmetrical, so that asymmetric aberration has been well corrected.

Example #2

Figure 6:
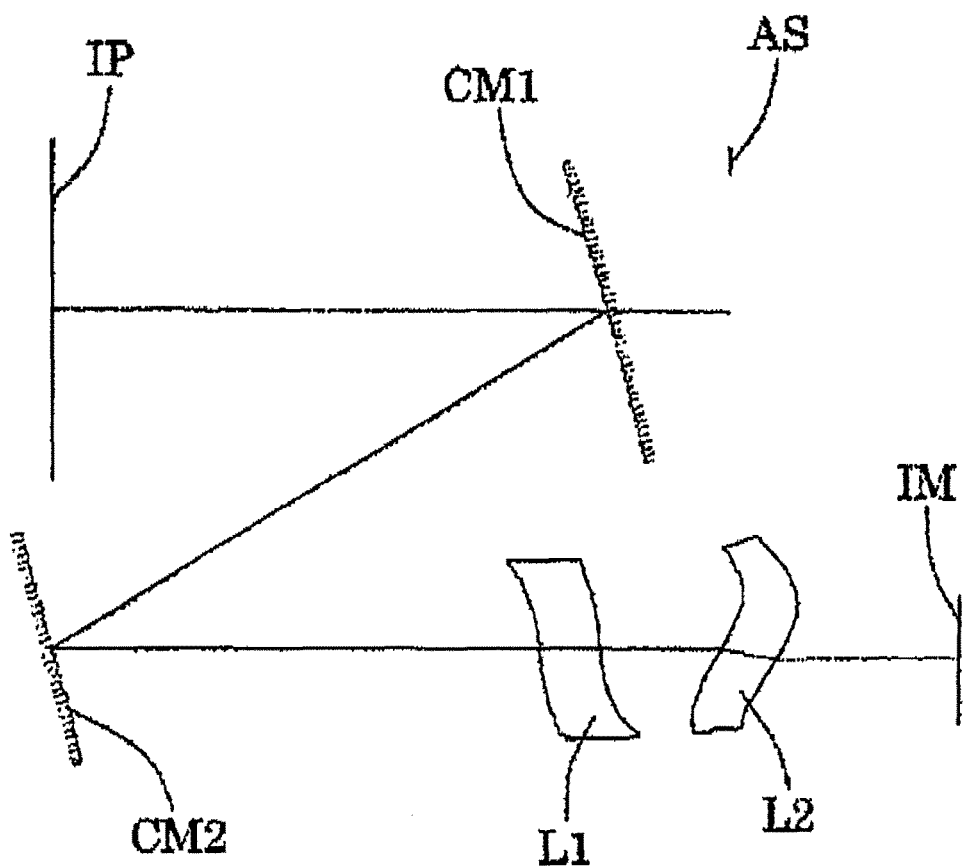
FIG. 6 is a figure schematically showing the cross sectional structure of a catadioptric photographic lens according to a second specific example, taken in the Y-Z plane.
Figure 7:
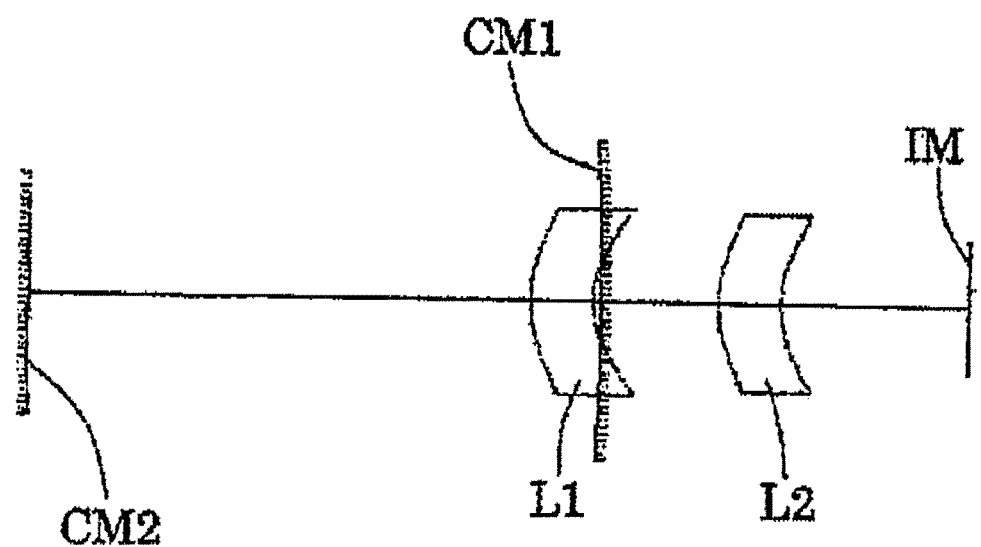
FIG. 7 is a figure schematically showing the cross sectional structure of this catadioptric photographic lens according to the second specific example, taken in the X-Z plane.
Figure 7:
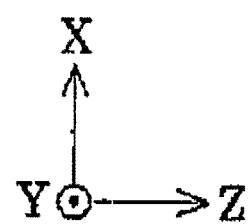

FIG. 6 is a figure schematically showing the cross sectional structure of a catadioptric photographic lens according to a second example, taken in the Y-Z plane. And FIG. 7 is a figure schematically showing the cross sectional structure of this catadioptric photographic lens according to the second example, taken in the X-Z plane. In this second example as well, as shown in FIG. 7, the lenses L1 and L2 have meniscus shapes on the third orthogonal plane (i.e. in the X-Z plane). The values of the specifications of the catadioptric photographic lens according to the second example are given in the following Table (2).

TABLE 2

<optical member specifications>

| surface number | X coordinate | Y coordinate | Z coordinate | inclination angle δ | |
|---|---|---|---|---|---|
| 1 | 0 | 0.00 | 182.37 | 15.56 | (CM1) |
| 2 | 0 | −110.00 | 0.02 | 15.56 | (CM2) |
| 3 | 0 | −110.44 | 159.96 | 5.89 | (L1; R11) |
| 4 | 0 | −110.00 | 179.93 | 5.89 | (L1; R12) |
| 5 | 0 | −109.23 | 219.96 | −29.11 | (L2; R21) |
| 6 | 0 | −109.59 | 238.48 | −29.11 | (L2; R22) |
| 7 | 0 | −111.81 | 300.00 | 0.00 | (IM) |

<aspheric surface data>

| surface number | 1 4 | 2 5 | 3 6 |
|---|---|---|---|
| C(2, 0) | −4.2211E−04 | 2.0120E−04 | 1.0987E−02 |
| | 1.6557E−02 | 1.2925E−02 | 1.4129E−02 |
| C(1, 1) | 0.0000E+00 | 0.0000E+00 | 0.0000E+00 |
| | 0.0000E+00 | 0.0000E+00 | 0.0000E+00 |
| C(0, 2) | −5.0324E−04 | 3.5143E−06 | −1.8829E−03 |
| | 7.3000E−04 | −7.2004E−04 | −3.8191E−03 |
| C(3, 0) | 0.0000E+00 | 0.0000E+00 | 0.0000E+00 |
| | 0.0000E+00 | 0.0000E+00 | 0.0000E+00 |
| C(1, 2) | 1.5613E−06 | 8.4106E−06 | 6.2083E−05 |
| | 3.0651E−04 | −1.4383E−04 | −2.9703E−04 |
| C(2, 1) | 0.0000E+00 | 0.0000E+00 | 0.0000E+00 |
| | 0.0000E+00 | 0.0000E+00 | 0.0000E+00 |
| C(0, 3) | 9.1061E−07 | 6.1526E−06 | −2.7236E−04 |
| | −2.6581E−04 | −7.1223E−05 | −1.2940E−04 |
| C(4, 0) | 2.5727E−09 | 1.2516E−08 | −1.1906E−06 |
| | −1.9379E−06 | −4.6943E−07 | 1.7353E−06 |

TABLE 2-continued

| | | | |
|---|---|---|---|
| C(3, 1) | 0.0000E+00 | 0.0000E+00 | 0.0000E+00 |
| | 0.0000E+00 | 0.0000E+00 | 0.0000E+00 |
| C(2, 2) | 4.0734E−09 | −9.5351E−09 | −1.3894E−05 |
| | −2.4851E−05 | −6.7569E−07 | 2.8757E−06 |
| C(1, 3) | 0.0000E+00 | 0.0000E+00 | 0.0000E+00 |
| | 0.0000E+00 | 0.0000E+00 | 0.0000E+00 |
| C(0, 4) | 6.9061E−10 | −2.4965E−08 | 9.5156E−07 |
| | 3.5629E−06 | −1.1725E−06 | −7.1129E−06 |
| C(5, 0) | 0.0000E+00 | 0.0000E+00 | 0.0000E+00 |
| | 0.0000E+00 | 0.0000E+00 | 0.0000E+00 |
| C(4, 1) | 2.2060E−11 | 3.4538E−11 | −1.2235E−07 |
| | −2.2611E−07 | 2.4746E−07 | 1.8244E−07 |
| C(3, 2) | 0.0000E+00 | 0.0000E+00 | 0.0000E+00 |
| | 0.0000E+00 | 0.0000E+00 | 0.0000E+00 |
| C(2, 3) | 1.7883E−11 | −2.5426E−11 | −9.0195E−08 |
| | 5.7057E−08 | −3.1592E−08 | 1.0264E−07 |
| C(1, 4) | 0.0000E+00 | 0.0000E+00 | 0.0000E+00 |
| | 0.0000E+00 | 0.0000E+00 | 0.0000E+00 |
| C(0, 5) | 2.2607E−13 | 1.3544E−10 | 3.9129E−08 |
| | −2.9614E−08 | −2.9715E−07 | −3.5595E−07 |
| C(6, 0) | 8.9180E−15 | −7.2765E−13 | −2.4742E−10 |
| | 4.3157E−11 | −1.6976E−09 | −2.3499E−09 |
| C(5, 1) | 0.0000E+00 | 0.0000E+00 | 0.0000E+00 |
| | 0.0000E+00 | 0.0000E+00 | 0.0000E+00 |
| C(4, 2) | 3.0995E−14 | −5.3092E−12 | −1.4095E−09 |
| | 9.2201E−10 | −7.9905E−09 | −9.6890E−09 |
| C(3, 3) | 0.0000E+00 | 0.0000E+00 | 0.0000E+00 |
| | 0.0000E+00 | 0.0000E+00 | 0.0000E+00 |
| C(2, 4) | 1.7018E−13 | 6.6962E−13 | 4.1715E−09 |
| | 7.4733E−09 | 8.5863E−09 | 1.6277E−08 |
| C(1, 5) | 0.0000E+00 | 0.0000E+00 | 0.0000E+00 |
| | 0.0000E+00 | 0.0000E+00 | 0.0000E+00 |
| C(0, 6) | 3.1256E−14 | −4.4439E−13 | −7.3302E−10 |
| | −1.0256E−11 | −6.9610E−09 | −8.5303E−09 |
| C(7, 0) | 0.0000E+00 | 0.0000E+00 | 0.0000E+00 |
| | 0.0000E+00 | 0.0000E+00 | 0.0000E+00 |
| C(6, 1) | −4.4805E−16 | −1.6130E−14 | −4.3338E−12 |
| | 5.2493E−11 | 1.5800E−10 | 3.0944E−10 |
| C(5, 2) | 0.0000E+00 | 0.0000E+00 | 0.0000E+00 |
| | 0.0000E+00 | 0.0000E+00 | 0.0000E+00 |
| C(4, 3) | 2.2891E−15 | 1.3135E−13 | 2.1186E−11 |
| | 1.0292E−10 | −5.8773E−11 | −1.4387E−10 |
| C(3, 4) | 0.0000E+00 | 0.0000E+00 | 0.0000E+00 |
| | 0.0000E+00 | 0.0000E+00 | 0.0000E+00 |
| C(2, 5) | 9.6681E−16 | 1.4544E−14 | 2.5663E−12 |
| | −9.5034E−11 | 3.2747E−10 | 1.0030E−10 |
| C(1, 6) | 0.0000E+00 | 0.0000E+00 | 0.0000E+00 |
| | 0.0000E+00 | 0.0000E+00 | 0.0000E+00 |
| C(0, 7) | 9.7654E−16 | 3.1260E−14 | −1.3069E−11 |
| | 2.6680E−11 | −2.3796E−10 | −2.3683E−10 |

<values corresponding to conditions>

Figure 8:
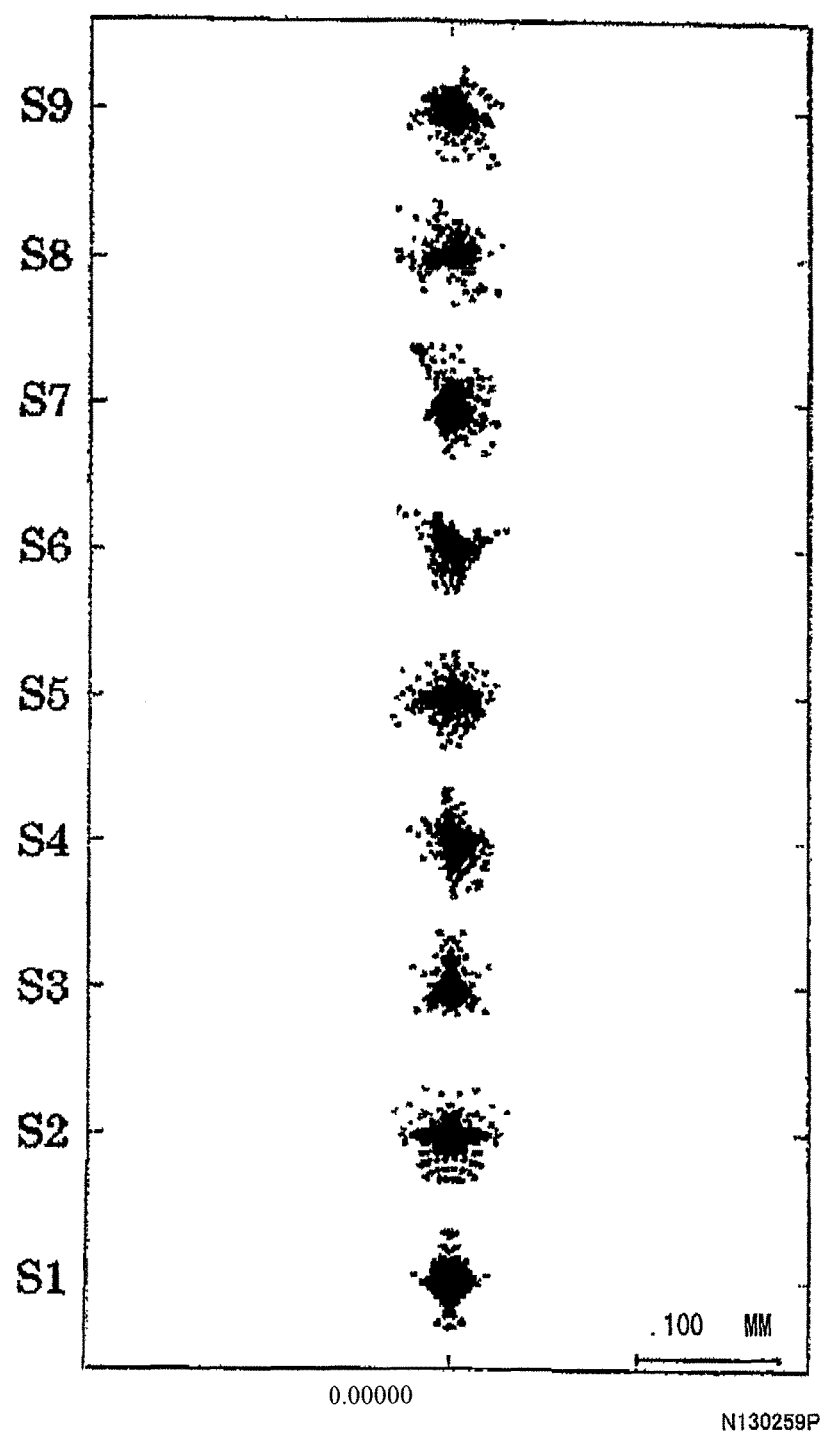
FIG. 8 is a figure showing aberration in this second specific example for the g line, for the e line, and for the C line, as spot diagrams.

$\theta 11$ = 5.89 degrees
$\theta 12$ = 5.89 degrees
$\theta 21$ = 29.11 degrees
$\theta 22$ = 29.11 degrees
$\Delta 1$ = |$\theta 11$ − $\theta 12$| = 0 degree
$\Delta 2$ = |$\theta 21$ − $\theta 22$| = 0 degree FIG. 8 is a figure showing aberration in this second example for the g line, for the e line, and for the C line, as spot diagrams. Referring to FIG. 8, it will be understood that in the second example as well, in a similar manner to the case for the first example, the size of the spot at each of the image points S1 through S9 is sufficiently small, and that aberration has been corrected uniformly and well over the entire image plane IM. Moreover it will be understood that the shape of the spot for each of the image points S1 through S9 is almost symmetrical, so that asymmetric aberration has been well corrected.

Example #3

Figure 9:
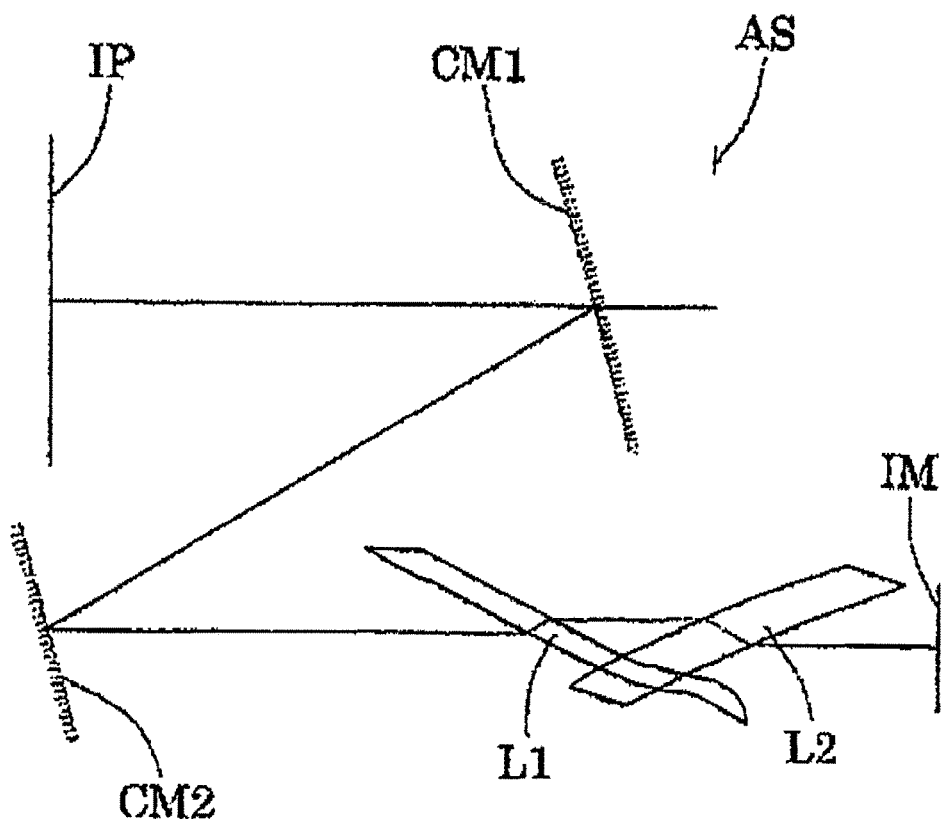
FIG. 9 is a figure schematically showing the cross sectional structure of a catadioptric photographic lens according to a third specific example, taken in the Y-Z plane.
Figure 10:
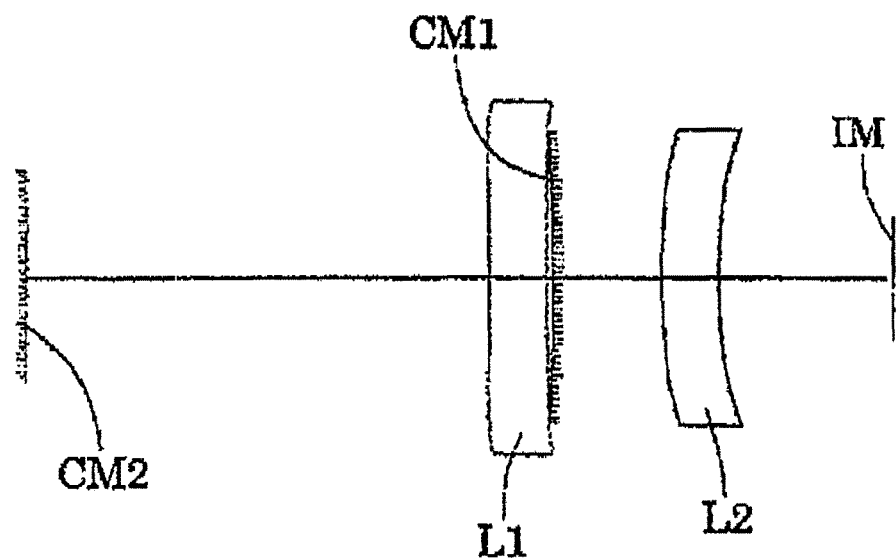
FIG. 10 is a figure schematically showing the cross sectional structure of this catadioptric photographic lens according to the third specific example, taken in the X-Z plane.
Figure 10:
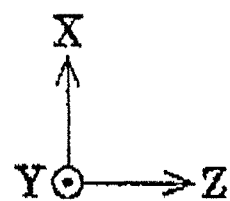

FIG. 9 is a figure schematically showing the cross sectional structure of a catadioptric photographic lens according to a third example, taken in the Y-Z plane. And FIG. 10 is a figure schematically showing the cross sectional structure of this catadioptric photographic lens according to the third example, taken in the X-Z plane. In this third example, as shown in FIG. 10, the lenses L1 and L2 both have meniscus shapes on the third orthogonal plane (i.e. the X-Z plane). The values of the specifications of the catadioptric photographic lens according to the third example are given in the following Table (3).

TABLE 3

<optical member specifications>

| surface number | X coordinate | Y coordinate | Z coordinate | inclination angle $\delta$ | |
|---|---|---|---|---|---|
| 1 | 0 | 0.00 | 182.37 | 15.33 | (CM1) |
| 2 | 0 | −110.06 | −0.45 | 15.33 | (CM2) |
| 3 | 0 | −108.48 | 160.01 | 64.05 | (L1; R11) |
| 4 | 0 | −117.31 | 168.15 | 64.05 | (L1; R12) |
| 5 | 0 | −103.30 | 220.10 | −65.95 | (L2; R21) |
| 6 | 0 | −107.37 | 235.91 | −65.95 | (L2; R22) |
| 7 | 0 | −111.42 | 300.00 | 0.00 | (IM) |

<aspheric surface data>

| surface number | 1 4 | 2 5 | 3 6 |
|---|---|---|---|
| C(2, 0) | −5.0222E−04 | −8.7543E−06 | 6.9590E−04 |
| | 1.7375E−03 | 4.4388E−03 | 5.1802E−03 |
| C(1, 1) | 0.0000E+00 | 0.0000E+00 | 0.0000E+00 |
| | 0.0000E+00 | 0.0000E+00 | 0.0000E+00 |
| C(0, 2) | −4.6957E−04 | 1.1668E−04 | 3.0512E−04 |
| | 7.8196E−04 | 5.6658E−04 | 8.5056E−04 |
| C(3, 0) | 0.0000E+00 | 0.0000E+00 | 0.0000E+00 |
| | 0.0000E+00 | 0.0000E+00 | 0.0000E+00 |
| C(1, 2) | 7.3146E−07 | 4.2881E−06 | −7.7462E−05 |
| | −6.0190E−05 | −3.6815E−05 | −4.3494E−05 |
| C(2, 1) | 0.0000E+00 | 0.0000E+00 | 0.0000E+00 |
| | 0.0000E+00 | 0.0000E+00 | 0.0000E+00 |
| C(0, 3) | 7.2747E−08 | 2.3530E−07 | 1.0403E−05 |
| | −3.8273E−05 | 1.8033E−05 | 2.6161E−05 |
| C(4, 0) | 1.1639E−09 | 1.0830E−08 | −1.0516E−06 |
| | −1.1045E−06 | 1.2348E−07 | 2.1912E−07 |
| C(3, 1) | 0.0000E+00 | 0.0000E+00 | 0.0000E+00 |
| | 0.0000E+00 | 0.0000E+00 | 0.0000E+00 |
| C(2, 2) | 1.7315E−09 | 1.6736E−08 | −1.2018E−07 |
| | −1.2600E−06 | 2.5136E−07 | −5.4416E−08 |
| C(1, 3) | 0.0000E+00 | 0.0000E+00 | 0.0000E+00 |
| | 0.0000E+00 | 0.0000E+00 | 0.0000E+00 |
| C(0, 4) | 2.1193E−10 | −1.8771E−09 | 2.2070E−07 |
| | 1.3486E−06 | 2.2763E−07 | −2.3940E−08 |
| C(5, 0) | 0.0000E+00 | 0.0000E+00 | 0.0000E+00 |
| | 0.0000E+00 | 0.0000E+00 | 0.0000E+00 |
| C(4, 1) | 4.4667E−12 | −1.6928E−11 | 2.1580E−09 |
| | −1.5074E−08 | −5.7077E−09 | −7.0860E−09 |
| C(3, 2) | 0.0000E+00 | 0.0000E+00 | 0.0000E+00 |
| | 0.0000E+00 | 0.0000E+00 | 0.0000E+00 |
| C(2, 3) | 1.1116E−11 | 2.9525E−10 | 2.1797E−08 |
| | 3.3404E−08 | −1.2034E−08 | −9.4440E−09 |
| C(1, 4) | 0.0000E+00 | 0.0000E+00 | 0.0000E+00 |
| | 0.0000E+00 | 0.0000E+00 | 0.0000E+00 |
| C(0, 5) | 5.1159E−11 | 1.1688E−09 | −1.8407E−08 |
| | −4.3728E−09 | −1.0398E−08 | −1.3714E−08 |
| C(6, 0) | 4.9431E−16 | −3.8126E−13 | 3.0785E−10 |
| | 2.3914E−10 | 9.6718E−11 | 2.2131E−10 |
| C(5, 1) | 0.0000E+00 | 0.0000E+00 | 0.0000E+00 |
| | 0.0000E+00 | 0.0000E+00 | 0.0000E+00 |
| C(4, 2) | 6.6877E−14 | 1.7617E−12 | 5.6625E−10 |
| | 8.8612E−10 | 5.5967E−11 | −4.3988E−11 |
| C(3, 3) | 0.0000E+00 | 0.0000E+00 | 0.0000E+00 |
| | 0.0000E+00 | 0.0000E+00 | 0.0000E+00 |
| C(2, 4) | 1.0668E−13 | −3.1576E−12 | −2.1109E−10 |
| | −9.7387E−11 | 9.2367E−11 | 3.6902E−10 |
| C(1, 5) | 0.0000E+00 | 0.0000E+00 | 0.0000E+00 |
| | 0.0000E+00 | 0.0000E+00 | 0.0000E+00 |
| C(0, 6) | 1.4176E−13 | −3.6356E−13 | −5.1643E−13 |
| | −4.1694E−10 | −1.7658E−11 | 1.0151E−14 |

TABLE 3-continued

| | | | |
|---|---|---|---|
| C(7, 0) | 0.0000E+00 | 0.0000E+00 | 0.0000E+00 |
| | 0.0000E+00 | 0.0000E+00 | 0.0000E+00 |
| C(6, 1) | −7.1005E−17 | −2.5799E−14 | 1.0556E−11 |
| | 9.7200E−12 | 1.3154E−11 | 2.5949E−11 |
| C(5, 2) | 0.0000E+00 | 0.0000E+00 | 0.0000E+00 |
| | 0.0000E+00 | 0.0000E+00 | 0.0000E+00 |
| C(4, 3) | −1.1181E−15 | −9.5781E−14 | −7.5230E−12 |
| | −8.1709E−12 | −3.5292E−12 | −9.6230E−12 |
| C(3, 4) | 0.0000E+00 | 0.0000E+00 | 0.0000E+00 |
| | 0.0000E+00 | 0.0000E+00 | 0.0000E+00 |
| C(2, 5) | 1.1288E−15 | 3.8744E−14 | −1.5462E−12 |
| | −2.1401E−12 | 2.4168E−12 | 4.5408E−12 |
| C(1, 6) | 0.0000E+00 | 0.0000E+00 | 0.0000E+00 |
| | 0.0000E+00 | 0.0000E+00 | 0.0000E+00 |
| C(0, 7) | 1.6133E−15 | 4.7258E−14 | 3.3755E−12 |
| | 4.3321E−12 | 1.7725E−12 | 1.6556E−12 |

<values corresponding to conditions>

Figure 11:
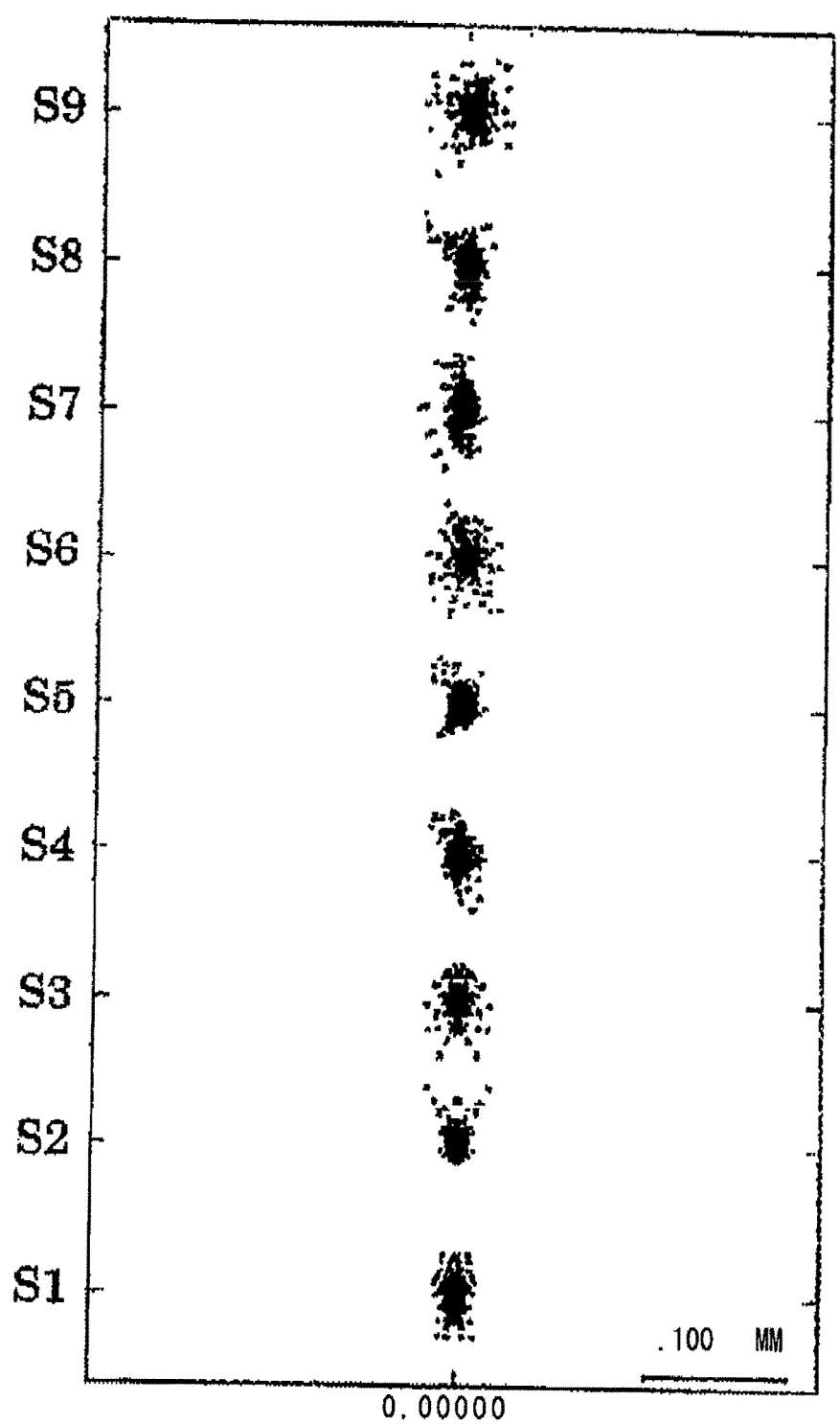
FIG. 11 is a figure showing aberration in this third specific example for the g line, for the e line, and for the C line, as spot diagrams.

$\theta 11$ = 64.05 degrees
$\theta 12$ = 64.05 degrees
$\theta 21$ = 65.95 degrees
$\theta 22$ = 65.95 degrees
$\Delta 1 = |\theta 11 - \theta 12| = 0$ degree
$\Delta 2 = |\theta 21 - \theta 22| = 0$ degree FIG. 11 is a figure showing aberration in this third example for the g line, for the e line, and for the C line, as spot diagrams. Referring to FIG. 11, it will be understood that in the third example as well, in a similar manner to the cases for the first example and for the second example, the size of the spot at each of the image points S1 through S9 is sufficiently small, and that aberration has been corrected uniformly and well over the entire image plane IM. Moreover it will be understood that the shape of the spot for each of the image points S1 through S9 is almost symmetrical, so that asymmetric aberration has been well corrected.

Example #4

Figure 12:
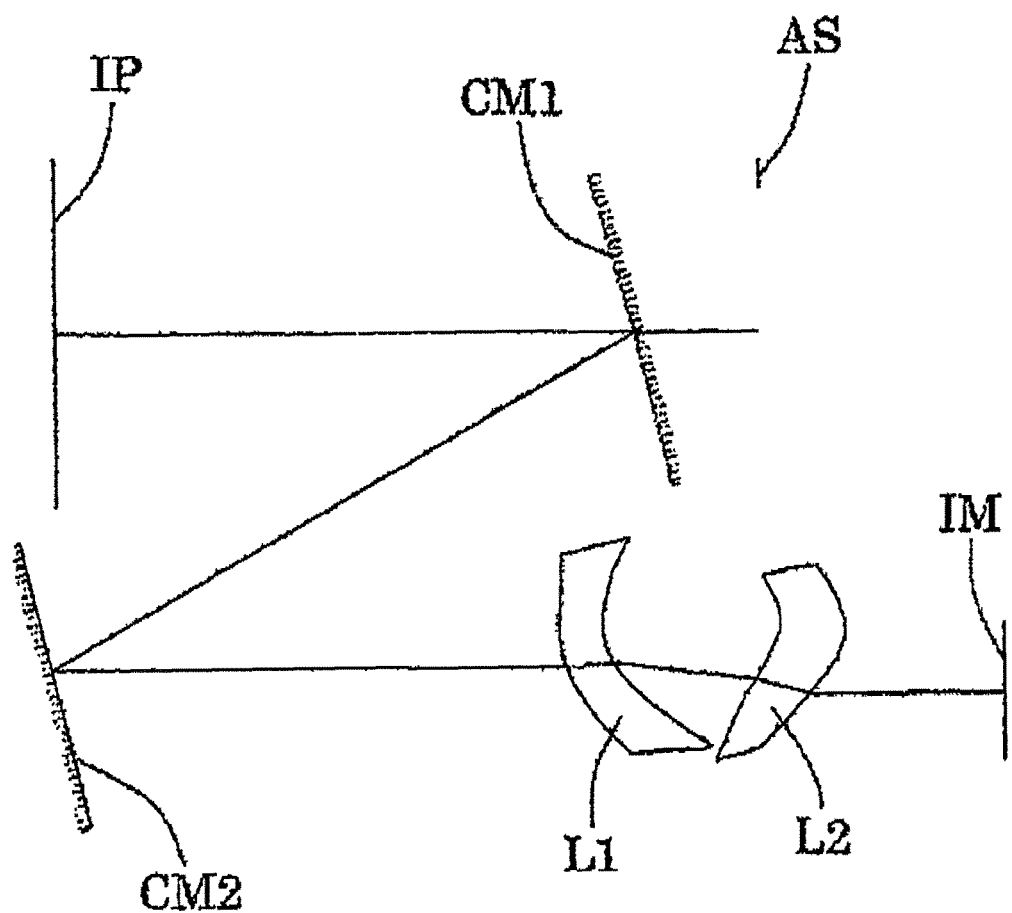
FIG. 12 is a figure schematically showing the cross sectional structure of a catadioptric photographic lens according to a fourth specific example, taken in the Y-Z plane.
Figure 12:
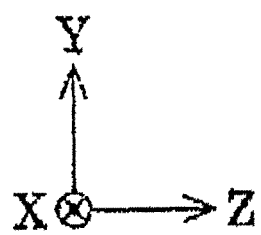
Figure 13:
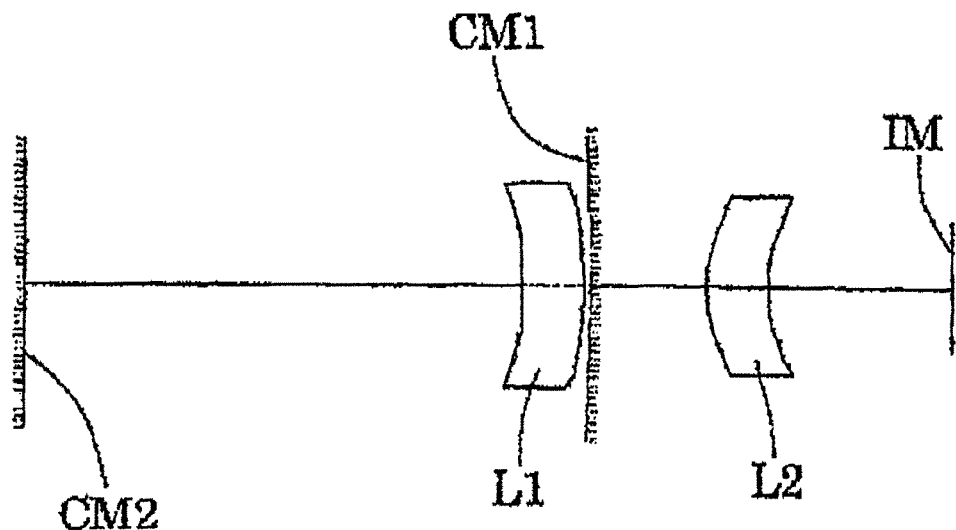
FIG. 13 is a figure schematically showing the cross sectional structure of this catadioptric photographic lens according to the fourth specific example, taken in the X-Z plane.
Figure 13:
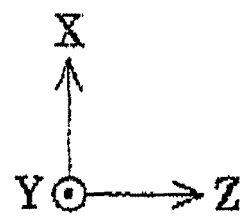

FIG. 12 is a figure schematically showing the cross sectional structure of a catadioptric photographic lens according to a fourth example, taken in the Y-Z plane. And FIG. 13 is a figure schematically showing the cross sectional structure of this catadioptric photographic lens according to the fourth example, taken in the X-Z plane. In this fourth example, as shown in FIG. 13, the lenses L1 and L2 both have meniscus shapes on the third orthogonal plane (i.e. in the X-Z plane). The values of the specifications of the catadioptric photographic lens according to the fourth example are given in the following Table (4).

TABLE 4

<optical member specifications>

| surface number | X coordinate | Y coordinate | Z coordinate | inclination angle δ | |
|---|---|---|---|---|---|
| 1 | 0 | 0.00 | 182.37 | 14.87 | (CM1) |
| 2 | 0 | −110.18 | −1.35 | 14.87 | (CM2) |
| 3 | 0 | −104.24 | 160.35 | 18.33 | (L1; R11) |
| 4 | 0 | −111.61 | 174.30 | 43.33 | (L1; R12) |
| 5 | 0 | −108.61 | 219.97 | −31.44 | (L2; R21) |
| 6 | 0 | −108.89 | 237.15 | −39.83 | (L2; R22) |
| 7 | 0 | −112.97 | 300.00 | 0.00 | (IM) |

TABLE 4-continued

<aspheric surface data>

| surface number | 1 4 | 2 5 | 3 6 |
|---|---|---|---|
| C(2, 0) | −5.1393E−04 | −4.4858E−05 | −3.1561E−03 |
| | −4.4639E−03 | 1.1901E−02 | 1.3367E−02 |
| C(1, 1) | 0.0000E+00 | 0.0000E+00 | 0.0000E+00 |
| | 0.0000E+00 | 0.0000E+00 | 0.0000E+00 |
| C(0, 2) | −4.1675E−04 | 5.6902E−05 | 1.3181E−02 |
| | 1.0602E−02 | 1.5533E−03 | −3.9581E−03 |
| C(3, 0) | 0.0000E+00 | 0.0000E+00 | 0.0000E+00 |
| | 0.0000E+00 | 0.0000E+00 | 0.0000E+00 |
| C(1, 2) | 3.7790E−07 | 9.9406E−07 | 2.0403E−04 |
| | 1.0332E−04 | −3.0675E−04 | −2.4927E−04 |
| C(2, 1) | 0.0000E+00 | 0.0000E+00 | 0.0000E+00 |
| | 0.0000E+00 | 0.0000E+00 | 0.0000E+00 |
| C(0, 3) | 1.5728E−06 | 9.3621E−06 | 3.9661E−05 |
| | 2.7207E−04 | −1.3872E−04 | −1.4560E−04 |
| C(4, 0) | 1.3869E−09 | 1.7383E−08 | −2.1254E−06 |
| | −1.8020E−06 | 9.0126E−08 | 1.9870E−06 |
| C(3, 1) | 0.0000E+00 | 0.0000E+00 | 0.0000E+00 |
| | 0.0000E+00 | 0.0000E+00 | 0.0000E+00 |
| C(2, 2) | −4.1423E−10 | −3.2935E−08 | 2.0797E−06 |
| | 2.2186E−06 | 2.4870E−06 | 3.4252E−06 |
| C(1, 3) | 0.0000E+00 | 0.0000E+00 | 0.0000E+00 |
| | 0.0000E+00 | 0.0000E+00 | 0.0000E+00 |
| C(0, 4) | −1.7187E−10 | −7.3959E−08 | −3.7083E−06 |
| | 5.2605E−06 | −2.8091E−06 | −7.4575E−06 |
| C(5, 0) | 0.0000E+00 | 0.0000E+00 | 0.0000E+00 |
| | 0.0000E+00 | 0.0000E+00 | 0.0000E+00 |
| C(4, 1) | −5.0396E−13 | −2.1380E−11 | −2.8857E−08 |
| | −4.3183E−08 | 7.2852E−08 | 3.4277E−08 |
| C(3, 2) | 0.0000E+00 | 0.0000E+00 | 0.0000E+00 |
| | 0.0000E+00 | 0.0000E+00 | 0.0000E+00 |
| C(2, 3) | 1.0649E−11 | 6.0977E−10 | −5.7630E−08 |
| | 4.9756E−08 | −2.4905E−08 | 8.0697E−08 |
| C(1, 4) | 0.0000E+00 | 0.0000E+00 | 0.0000E+00 |
| | 0.0000E+00 | 0.0000E+00 | 0.0000E+00 |
| C(0, 5) | −4.6480E−12 | 5.0202E−10 | −5.7991E−08 |
| | 9.2449E−08 | −3.1990E−07 | −3.7740E−07 |
| C(6, 0) | 2.0582E−15 | −4.1817E−13 | 4.0188E−11 |
| | 3.3683E−10 | −3.7927E−10 | −1.4594E−09 |
| C(5, 1) | 0.0000E+00 | 0.0000E+00 | 0.0000E+00 |
| | 0.0000E+00 | 0.0000E+00 | 0.0000E+00 |
| C(4, 2) | 3.7744E−14 | 2.7293E−13 | 1.0052E−09 |
| | −1.9686E−10 | −5.0018E−09 | −4.2932E−09 |
| C(3, 3) | 0.0000E+00 | 0.0000E+00 | 0.0000E+00 |
| | 0.0000E+00 | 0.0000E+00 | 0.0000E+00 |
| C(2, 4) | −5.1310E−14 | −6.1205E−12 | 7.7090E−10 |
| | 1.7230E−09 | −3.6361E−09 | 7.8712E−09 |
| C(1, 5) | 0.0000E+00 | 0.0000E+00 | 0.0000E+00 |
| | 0.0000E+00 | 0.0000E+00 | 0.0000E+00 |
| C(0, 6) | 8.9045E−14 | −2.1271E−12 | −5.4587E−11 |
| | 7.9252E−10 | −1.0740E−08 | −8.6622E−09 |
| C(7, 0) | 0.0000E+00 | 0.0000E+00 | 0.0000E+00 |
| | 0.0000E+00 | 0.0000E+00 | 0.0000E+00 |
| C(6, 1) | −2.6009E−16 | −3.2200E−14 | −8.4884E−12 |
| | −1.7506E−11 | −2.8028E−11 | −4.9891E−11 |
| C(5, 2) | 0.0000E+00 | 0.0000E+00 | 0.0000E+00 |
| | 0.0000E+00 | 0.0000E+00 | 0.0000E+00 |
| C(4, 3) | 6.0319E−16 | 1.4295E−14 | 1.1002E−11 |
| | −7.7649E−11 | 1.0604E−10 | −2.2442E−11 |
| C(3, 4) | 0.0000E+00 | 0.0000E+00 | 0.0000E+00 |
| | 0.0000E+00 | 0.0000E+00 | 0.0000E+00 |
| C(2, 5) | −2.1080E−15 | 6.5636E−16 | −2.4898E−11 |
| | 4.8416E−11 | 1.0854E−10 | 1.8329E−10 |
| C(1, 6) | 0.0000E+00 | 0.0000E+00 | 0.0000E+00 |
| | 0.0000E+00 | 0.0000E+00 | 0.0000E+00 |
| C(0, 7) | 7.6313E−16 | 5.9530E−15 | 1.2579E−11 |
| | −1.0702E−12 | 2.7981E−11 | −3.4522E−11 |

TABLE 4-continued

Figure 14:
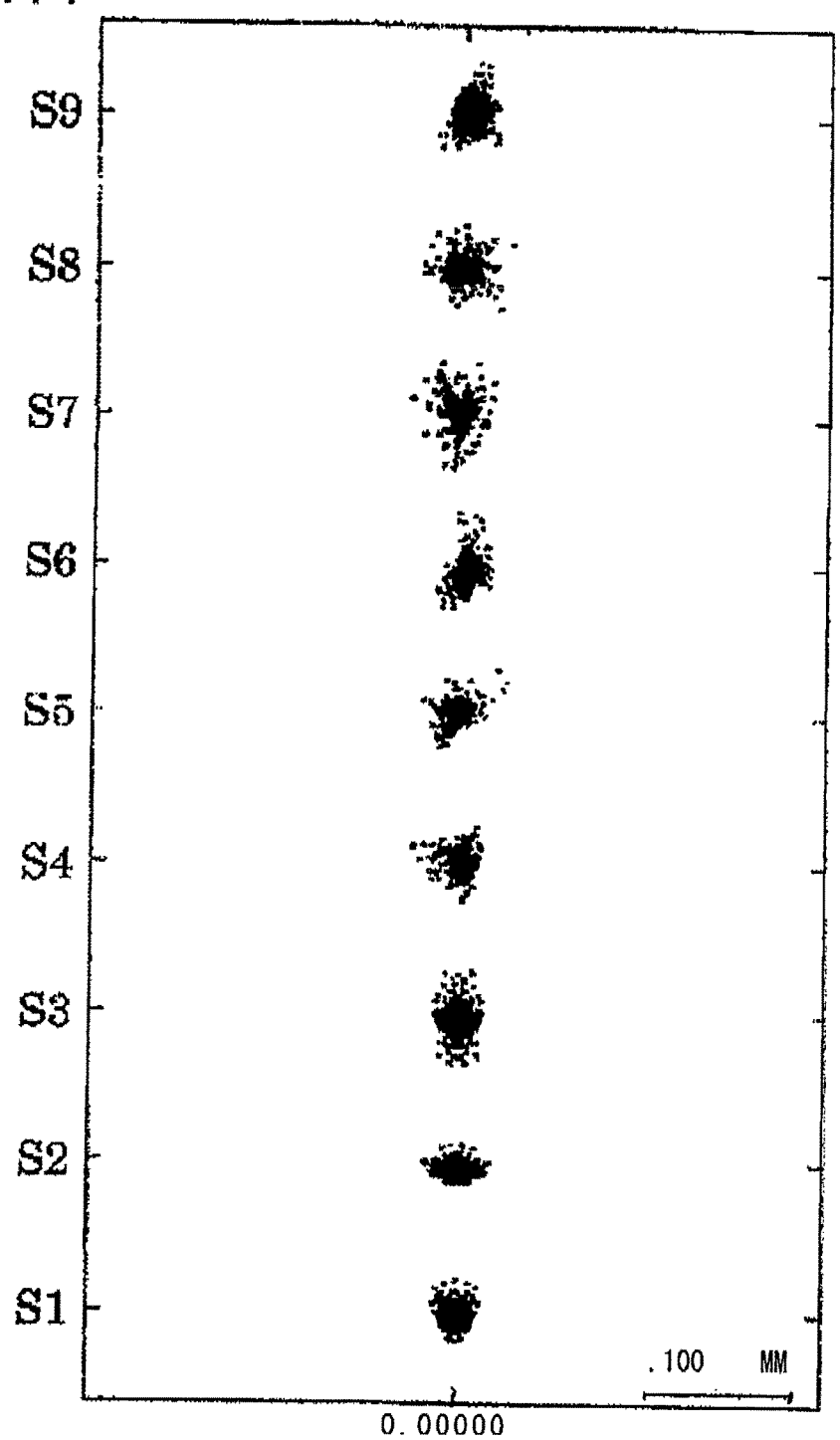
FIG. 14 is a figure showing aberration in this fourth specific example for the g for the e line, and for the C line, as spot diagrams.

<values corresponding to conditions>

θ11 = 18.33 degrees
θ12 = 43.33 degrees
θ21 = 31.44 degrees
θ22 = 39.83 degrees
Δ1 = |θ11 − θ12| = 25.00 degrees
Δ2 = |θ21 − θ22| = 8.39 degrees FIG. 14 is a figure showing aberration in this fourth example for the g line, for the e line, and for the C line, as spot diagrams. Referring to FIG. 14, it will be understood that in the fourth example as well, in a similar manner to the cases for the first through the third examples, the size of the spot at each of the image points S1 through S9 is sufficiently small, and that aberration has been corrected uniformly and well over the entire image plane IM. Moreover it will be understood that the shape of the spot for each of the image points S1 through S9 is almost symmetrical, so that asymmetric aberration has been well corrected.

Example #5

Figure 15:
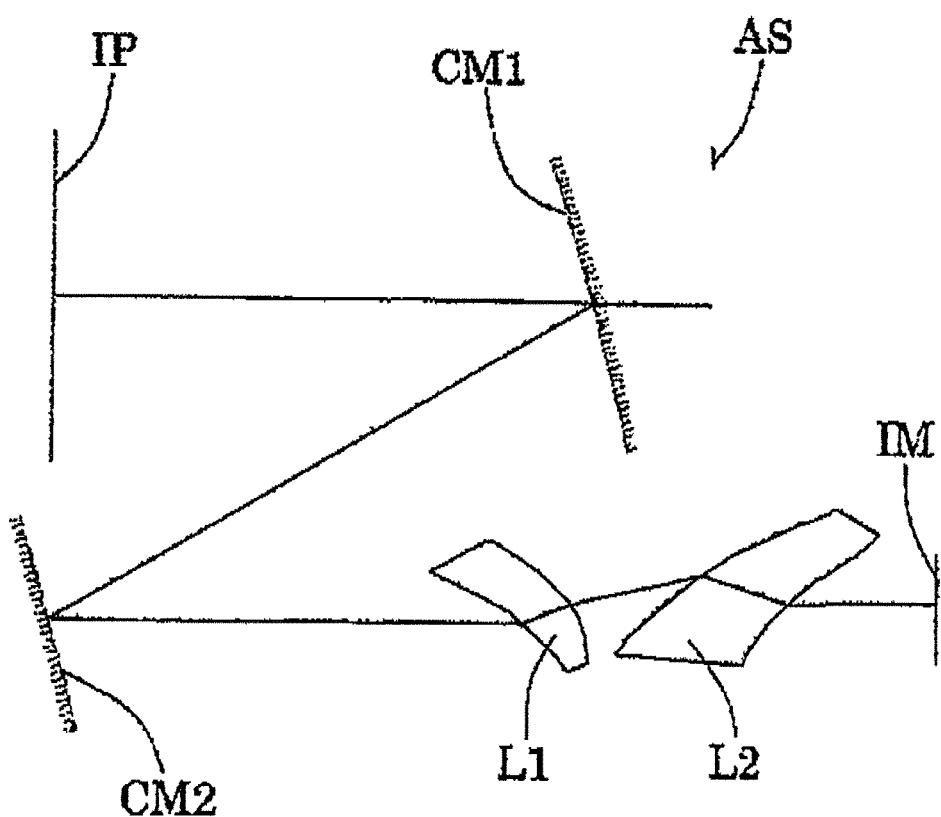
FIG. 15 is a figure schematically showing the cross sectional structure of a catadioptric photographic lens according to a fifth specific example, taken in the Y-Z plane.
Figure 15:
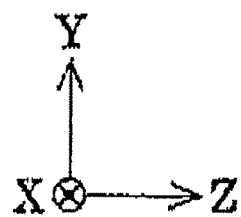
Figure 16:
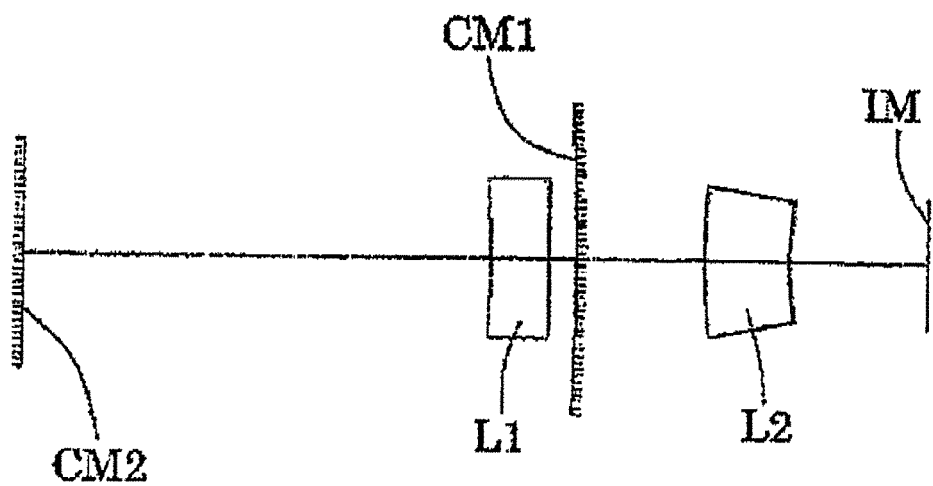
FIG. 16 is a figure schematically showing the cross sectional structure of this catadioptric photographic lens according to the fifth specific example, taken in the X-Z plane.
Figure 16:
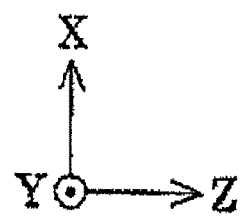

FIG. 15 is a figure schematically showing the cross sectional structure of a catadioptric photographic lens according to a fifth example, taken in the Y-Z plane. And FIG. 16 is a figure schematically showing the cross sectional structure of this catadioptric photographic lens according to the fifth example, taken in the X-Z plane. In this fifth example, as shown in FIG. 16, the lenses L1 and L2 both have meniscus shapes on the third orthogonal plane (i.e. in the X-Z plane). The values of the specifications of the catadioptric photographic lens according to the fifth example are given in the following Table (5).

TABLE 5

<optical member specifications>

| surface number | X coordinate | Y coordinate | Z coordinate | inclination angle δ | |
|---|---|---|---|---|---|
| 1 | 0 | 0.00 | 182.37 | 15.26 | (CM1) |
| 2 | 0 | −110.08 | −0.58 | 15.26 | (CM2) |
| 3 | 0 | −108.77 | 159.01 | 51.57 | (L1; R11) |
| 4 | 0 | −110.87 | 177.36 | 16.57 | (L1; R12) |
| 5 | 0 | −90.18 | 219.97 | −55.01 | (L2; R21) |
| 6 | 0 | −113.34 | 248.00 | −35.64 | (L2; R22) |
| 7 | 0 | −98.70 | 300.00 | 0.00 | (IM) |

<aspheric surface data>

| surface number | 1 4 | 2 5 | 3 6 |
|---|---|---|---|
| C(2, 0) | −4.7124E−04 | 1.1233E−04 | 9.1233E−04 |
| | 3.9694E−03 | 4.2936E−03 | 8.8476E−03 |
| C(1, 1) | 0.0000E+00 | 0.0000E+00 | 0.0000E+00 |
| | 0.0000E+00 | 0.0000E+00 | 0.0000E+00 |
| C(0, 2) | −6.1225E−04 | −2.7608E−04 | −6.9983E−03 |
| | −1.5930E−02 | 3.0917E−03 | 6.8870E−03 |
| C(3, 0) | 0.0000E+00 | 0.0000E+00 | 0.0000E+00 |
| | 0.0000E+00 | 0.0000E+00 | 0.0000E+00 |
| C(1, 2) | 6.8093E−07 | 4.7230E−06 | −1.4827E−04 |
| | −1.7676E−04 | −1.4271E−05 | −7.1655E−05 |
| C(2, 1) | 0.0000E+00 | 0.0000E+00 | 0.0000E+00 |
| | 0.0000E+00 | 0.0000E+00 | 0.0000E+00 |
| C(0, 3) | 3.8291E−07 | 2.5399E−06 | 5.6492E−05 |
| | −1.4011E−04 | 1.1204E−06 | −7.7880E−05 |
| C(4, 0) | 1.6988E−09 | 1.4469E−08 | −8.8054E−07 |
| | 9.3565E−08 | 3.4854E−07 | 9.0737E−07 |
| C(3, 1) | 0.0000E+00 | 0.0000E+00 | 0.0000E+00 |
| | 0.0000E+00 | 0.0000E+00 | 0.0000E+00 |
| C(2, 2) | 2.2226E−09 | 3.6264E−08 | 1.1416E−06 |
| | −4.0081E−06 | −1.2247E−07 | 2.3398E−06 |
| C(1, 3) | 0.0000E+00 | 0.0000E+00 | 0.0000E+00 |
| | 0.0000E+00 | 0.0000E+00 | 0.0000E+00 |
| C(0, 4) | 3.7335E−09 | 9.7853E−08 | −1.2705E−07 |
| | 6.1666E−06 | 3.9422E−07 | 3.7352E−06 |
| C(5, 0) | 0.0000E+00 | 0.0000E+00 | 0.0000E+00 |
| | 0.0000E+00 | 0.0000E+00 | 0.0000E+00 |
| C(4, 1) | 5.8751E−12 | −7.8795E−11 | 4.0035E−09 |
| | −1.2930E−07 | −1.0722E−08 | −1.2521E−08 |
| C(3, 2) | 0.0000E+00 | 0.0000E+00 | 0.0000E+00 |
| | 0.0000E+00 | 0.0000E+00 | 0.0000E+00 |
| C(2, 3) | 1.1361E−11 | −2.1529E−10 | 3.1906E−08 |
| | 1.1866E−07 | −2.9046E−08 | −2.4804E−08 |
| C(1, 4) | 0.0000E+00 | 0.0000E+00 | 0.0000E+00 |
| | 0.0000E+00 | 0.0000E+00 | 0.0000E+00 |
| C(0, 5) | −6.1419E−12 | −4.8392E−10 | 9.0679E−09 |
| | −8.1717E−08 | −5.9320E−09 | −6.6746E−08 |
| C(6, 0) | 1.8715E−14 | −8.4283E−14 | −3.2930E−10 |
| | −1.2154E−09 | −8.0249E−11 | 5.4212E−11 |
| C(5, 1) | 0.0000E+00 | 0.0000E+00 | 0.0000E+00 |
| | 0.0000E+00 | 0.0000E+00 | 0.0000E+00 |
| C(4, 2) | 8.5349E−14 | 7.8279E−13 | 9.8169E−10 |
| | 5.2115E−09 | 4.3633E−10 | −1.9665E−10 |
| C(3, 3) | 0.0000E+00 | 0.0000E+00 | 0.0000E+00 |
| | 0.0000E+00 | 0.0000E+00 | 0.0000E+00 |
| C(2, 4) | 5.4769E−14 | −4.1533E−12 | −4.5943E−10 |
| | −2.1639E−10 | −2.2162E−11 | −2.1806E−09 |
| C(1, 5) | 0.0000E+00 | 0.0000E+00 | 0.0000E+00 |
| | 0.0000E+00 | 0.0000E+00 | 0.0000E+00 |
| C(0, 6) | 6.9453E−14 | −3.9555E−12 | −2.0475E−10 |
| | 7.9122E−10 | −1.1954E−10 | 6.7853E−10 |
| C(7, 0) | 0.0000E+00 | 0.0000E+00 | 0.0000E+00 |
| | 0.0000E+00 | 0.0000E+00 | 0.0000E+00 |
| C(6, 1) | 2.2061E−16 | 8.9158E−15 | 1.8922E−11 |
| | 4.8483E−11 | −1.8353E−12 | 1.6723E−14 |
| C(5, 2) | 0.0000E+00 | 0.0000E+00 | 0.0000E+00 |
| | 0.0000E+00 | 0.0000E+00 | 0.0000E+00 |
| C(4, 3) | −5.1958E−17 | 1.4891E−14 | −2.0726E−11 |
| | −5.9706E−11 | −4.0873E−12 | 1.4414E−11 |
| C(3, 4) | 0.0000E+00 | 0.0000E+00 | 0.0000E+00 |
| | 0.0000E+00 | 0.0000E+00 | 0.0000E+00 |
| C(2, 5) | 1.3457E−15 | 1.8466E−13 | 1.2438E−12 |
| | −1.8377E−12 | 1.0703E−11 | 3.9784E−11 |
| C(1, 6) | 0.0000E+00 | 0.0000E+00 | 0.0000E+00 |
| | 0.0000E+00 | 0.0000E+00 | 0.0000E+00 |
| C(0, 7) | −5.5501E−16 | −3.8044E−15 | 1.4599E−12 |
| | −3.0853E−12 | 1.0919E−12 | −1.0658E−11 |

Figure 17:
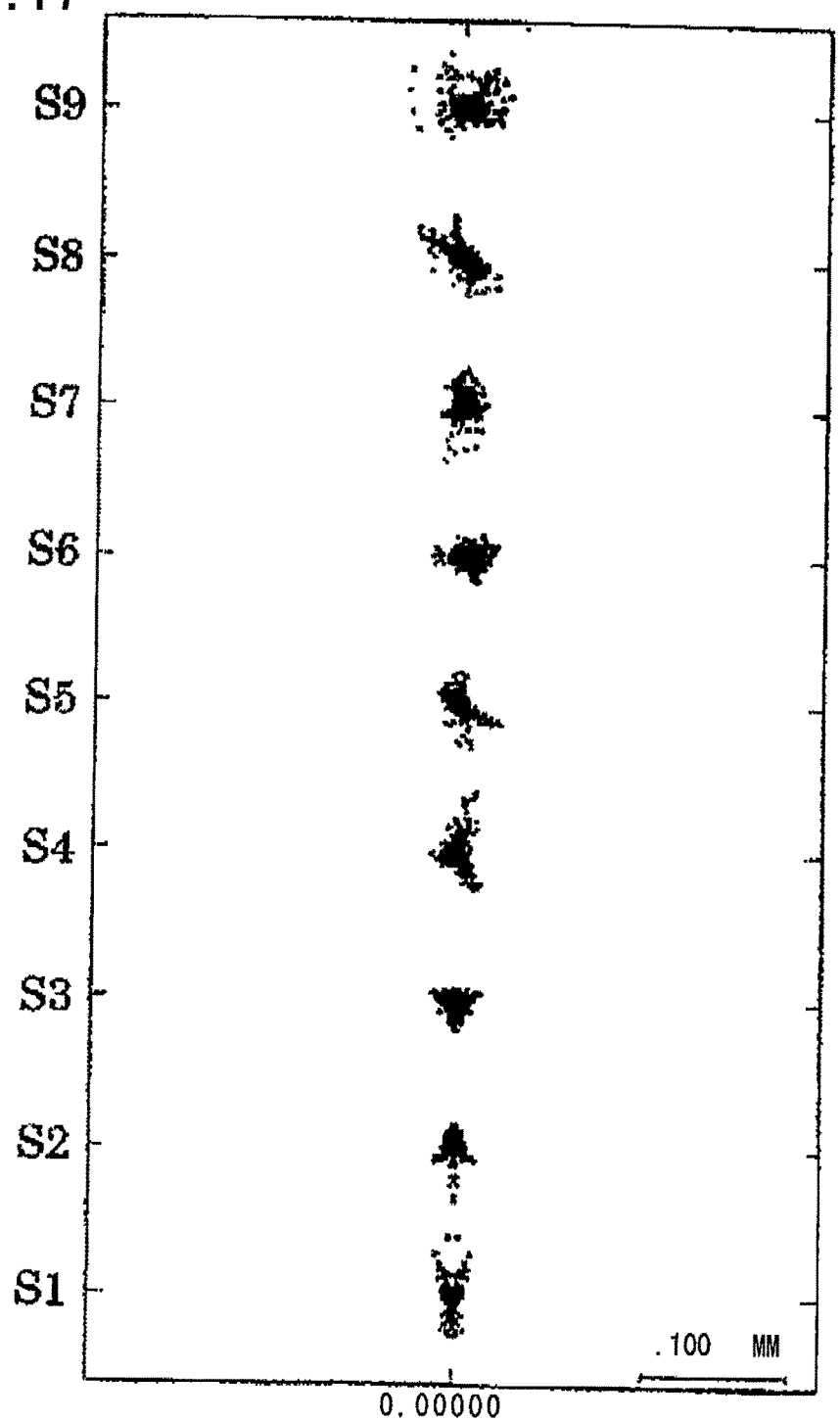
FIG. 17 is a figure showing aberration in this fifth specific example for the g line, for the e line, and for the C line, as spot diagrams.

<values corresponding to conditions>

θ11 = 51.57 degrees
θ12 = 16.57 degrees
θ21 = 55.01 degrees
θ22 = 35.64 degrees
Δ1 = |θ11 − θ12| = 35.00 degrees
Δ2 = |θ21 − θ22| = 19.37 degrees FIG. 17 is a figure showing aberration in this fifth example for the g line, for the e line, and for the C line, as spot diagrams. Referring to FIG. 17, it will be understood that in the fifth example as well, in a similar manner to the cases for the first through the fourth examples, the size of the spot at each of the image points S1 through S9 is sufficiently small, and that aberration has been corrected uniformly and well over the entire image plane IM. Moreover it will be understood that the shape of the spot for each of the image points S1 through S9 is almost symmetrical, so that asymmetric aberration has been well corrected.

Example #6

Figure 18:
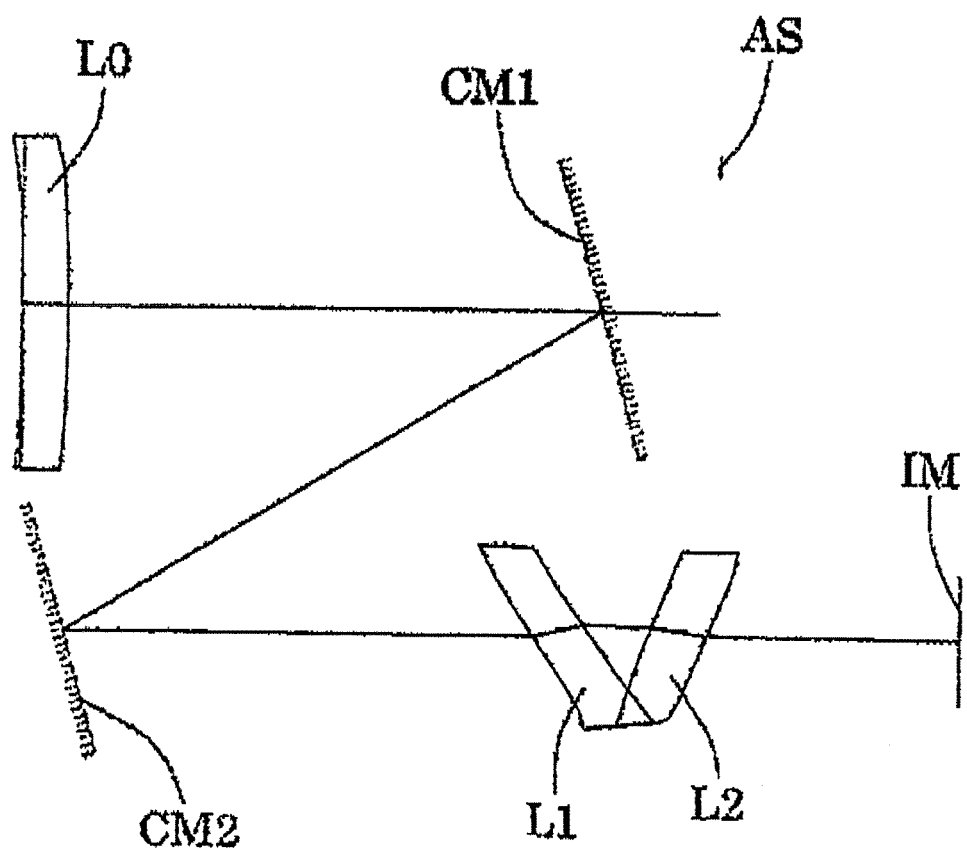
FIG. 18 is a figure schematically showing the cross sectional structure of a catadioptric photographic lens according to a sixth specific example, taken in the Y-Z plane.
Figure 19:
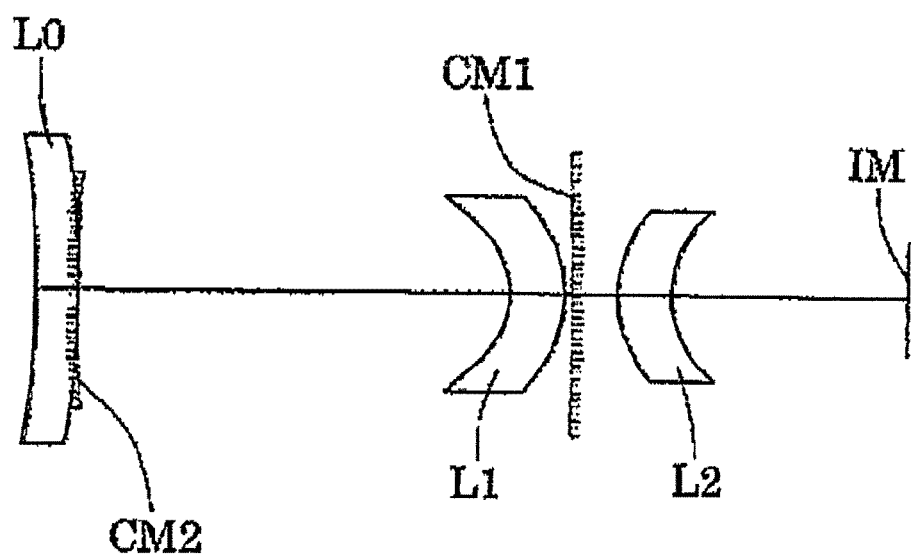
FIG. 19 is a figure schematically showing the cross sectional structure of this catadioptric photographic lens according to the sixth specific example, taken in the X-Z plane.
Figure 19:
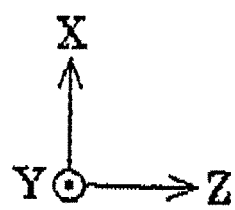

FIG. 18 is a figure schematically showing the cross sectional; structure of the catadioptric photographic lens according to a sixth example, taken in the Y-Z plane. And FIG. 19 is a figure schematically showing the cross sectional structure of this catadioptric photographic lens according to the sixth example, taken in the X-Z plane. In this sixth example, as shown in FIG. 19, the lenses L1 and L2 both have meniscus shapes on the third orthogonal plane (i.e., in the X-Z plane). Moreover, in this sixth example, a protective lens L0 is disposed on the object side of the first reflecting mirror CM1.

Accordingly, the first surface is the incident surface of the protective lens L0, the second surface is the exit surface of the protective lens L0, the third surface is the reflection surface of the first reflecting mirror CM1, the fourth surface is the reflection surface of the second reflecting mirror CM2, the fifth surface is the incident surface R11 of the lens L1, the sixth surface is the exit surface R12 of the lens L1, the seventh surface is the incident surface R21 of the lens L2, the eighth surface is the exit surface R22 of the lens L2, and the ninth surface is the image plane IM.

As previously described, the x axis, the y axis, and the z axis of the local coordinate system (x,y,z) of the incident surface and the exit surface of the protective lens L0 are set to be respectively parallel to the X axis, to the Y axis, and to the Z axis. The region in Table (6) for the aspheric surface data gives the parameters of Equation (1) for defining the rotationally asymmetric aspheric surfaces of the protective lens L0, the first reflecting mirror CM1, the second reflecting mirror CM2, and the lens groups L1 and L2. The values of the specifications of the catadioptric photographic lens according to the sixth example are given in the following Table (6).

TABLE 6

<optical member specifications>

| surface number | X coordinate | Y coordinate | Z coordinate | inclination angle δ | |
|---|---|---|---|---|---|
| 1 | 0 | 0.00 | 0.00 | 0.0 | (incident surface of L0) |
| 2 | 0 | 0.00 | 15.00 | 0.00 | (exit surface of L0) |
| 3 | 0 | 0.00 | 197.37 | 15.53 | (CM1) |
| 4 | 0 | −110.00 | 14.97 | 15.53 | (CM2) |
| 5 | 0 | −110.03 | 174.91 | 34.33 | (L1; R11) |
| 6 | 0 | −110.93 | 192.14 | 35.89 | (L1; R12) |
| 7 | 0 | −110.26 | 215.77 | −21.44 | (L2; R21) |
| 8 | 0 | −110.07 | 234.72 | −23.37 | (L2; R22) |
| 9 | 0 | −109.25 | 322.23 | 0.00 | (IM) |

<aspheric surface data>

| surface number | 1 4 7 | 2 5 8 | 3 6 |
|---|---|---|---|
| C(2, 0) | −1.0145E−03<br>7.2340E−04<br>1.2247E−02 | −1.1202E−03<br>−2.1794E−02<br>1.5372E−02 | −2.5556E−04<br>−1.4712E−02 |
| C(1, 1) | 0.0000E+00<br>0.0000E+00<br>0.0000E+00 | 0.0000E+00<br>0.0000E+00<br>0.0000E+00 | 0.0000E+00<br>0.0000E+00 |
| C(0, 2) | −1.9340E−04<br>4.4300E−06<br>0.0000E+00 | −2.2531E−04<br>0.0000E+00<br>0.0000E+00 | −4.6131E−04<br>0.0000E+00 |
| C(3, 0) | 0.0000E+00<br>0.0000E+00<br>0.0000E+00 | 0.0000E+00<br>0.0000E+00<br>0.0000E+00 | 0.0000E+00<br>0.0000E+00 |
| C(1, 2) | −5.5764E−05<br>−1.8245E−06<br>−4.8736E−05 | −5.2861E−05<br>7.8909E−05<br>−2.5369E−05 | −1.1595E−06<br>4.0287E−05 |
| C(2, 1) | 0.0000E+00<br>0.0000E+00<br>0.0000E+00 | 0.0000E+00<br>0.0000E+00<br>0.0000E+00 | 0.0000E+00<br>0.0000E+00 |

TABLE 6-continued

| | | | |
|---|---|---|---|
| C(0, 3) | −2.7135E−06<br>−6.6065E−07<br>−2.7378E−05 | −2.6259E−06<br>1.6071E−05<br>2.7130E−05 | 5.3343E−08<br>−5.8083E−06 |
| C(4, 0) | −3.9600E−08<br>1.4648E−08<br>3.6137E−07 | −1.6279E−08<br>−7.2808E−07<br>−5.7647E−07 | −2.6429E−09<br>1.0865E−07 |
| C(3, 1) | 0.0000E+00<br>0.0000E+00<br>0.0000E+00 | 0.0000E+00<br>0.0000E+00<br>0.0000E+00 | 0.0000E+00<br>0.0000E+00 |
| C(2, 2) | 1.3353E−07<br>−2.0866E−09<br>6.2146E−06 | 1.9081E−07<br>−6.9711E−07<br>4.1398E−06 | −7.4930E−09<br>5.9190E−07 |
| C(1, 3) | 0.0000E+00<br>0.0000E+00<br>0.0000E+00 | 0.0000E+00<br>0.0000E+00<br>0.0000E+00 | 0.0000E+00<br>0.0000E+00 |
| C(0, 4) | −2.3432E−07<br>−2.2831E−08<br>3.0632E−06 | −2.2523E−07<br>2.5483E−07<br>1.2236E−06 | −4.2590E−09<br>5.7091E−07 |
| C(5, 0) | 0.0000E+00<br>0.0000E+00<br>0.0000E+00 | 0.0000E+00<br>0.0000E+00<br>0.0000E+00 | 0.0000E+00<br>0.0000E+00 |
| C(4, 1) | −3.2188E−09<br>6.8704E−10<br>−2.5522E−08 | −3.6337E−09<br>−4.6621E−08<br>−3.9034E−08 | 2.7071E−10<br>−1.8772E−08 |
| C(3, 2) | 0.0000E+00<br>0.0000E+00<br>0.0000E+00 | 0.0000E+00<br>0.0000E+00<br>0.0000E+00 | 0.0000E+00<br>0.0000E+00 |
| C(2, 3) | −2.1229E−09<br>−2.3365E−10<br>−1.1820E−07 | −2.0126E−09<br>1.0059E−07<br>−6.6716E−08 | 7.4580E−13<br>5.1828E−08 |
| C(1, 4) | 0.0000E+00<br>0.0000E+00<br>0.0000E+00 | 0.0000E+00<br>0.0000E+00<br>0.0000E+00 | 0.0000E+00<br>0.0000E+00 |
| C(0, 5) | −9.2615E−10<br>−2.9002E−10<br>−9.9826E−09 | −8.1077E−10<br>2.6119E−08<br>−1.1195E−08 | −3.0003E−11<br>8.8447E−09 |
| C(6, 0) | −4.1988E−12<br>1.0245E−12<br>9.0556E−10 | −3.6166E−12<br>−3.0119E−11<br>3.2924E−09 | 3.6359E−13<br>−1.2868E−10 |
| C(5, 1) | 0.0000E+00<br>0.0000E+00<br>0.0000E+00 | 0.0000E+00<br>0.0000E+00<br>0.0000E+00 | 0.0000E+00<br>0.0000E+00 |
| C(4, 2) | 2.5755E−12<br>5.0641E−12<br>2.9965E−09 | 9.6486E−12<br>−2.5482E−09<br>7.5379E−09 | 5.5588E−13<br>−1.2202E−09 |
| C(3, 3) | 0.0000E+00<br>0.0000E+00<br>0.0000E+00 | 0.0000E+00<br>0.0000E+00<br>0.0000E+00 | 0.0000E+00<br>0.0000E+00 |
| C(2, 4) | 6.3634E−13<br>−4.2031E−13<br>5.4179E−10 | 3.8754E−12<br>−4.1918E−09<br>2.2941E−09 | −3.4375E−14<br>−2.0589E−09 |
| C(1, 5) | 0.0000E+00<br>0.0000E+00<br>0.0000E+00 | 0.0000E+00<br>0.0000E+00<br>0.0000E+00 | 0.0000E+00<br>0.0000E+00 |
| C(0, 6) | 1.8503E−13<br>7.6116E−13<br>−2.3721E−09 | 2.6075E−12<br>−4.2429E−10<br>−3.1390E−09 | 8.6188E−14<br>1.2428E−10 |
| C(7, 0) | 0.0000E+00<br>0.0000E+00<br>0.0000E+00 | 0.0000E+00<br>0.0000E+00<br>0.0000E+00 | 0.0000E+00<br>0.0000E+00 |
| C(6, 1) | 9.5888E−14<br>−1.6174E−15<br>−2.5349E−11 | 1.0015E−13<br>8.6665E−12<br>−7.1373E−11 | −1.5184E−15<br>−4.4504E−12 |
| C(5, 2) | 0.0000E+00<br>0.0000E+00<br>0.0000E+00 | 0.0000E+00<br>0.0000E+00<br>0.0000E+00 | 0.0000E+00<br>0.0000E+00 |
| C(4, 3) | 7.5405E−14<br>−4.3499E−14<br>−3.9429E−11 | 4.1240E−14<br>8.4643E−11<br>−1.8646E−10 | −9.2771E−15<br>4.4138E−11 |
| C(3, 4) | 0.0000E+00<br>0.0000E+00<br>0.0000E+00 | 0.0000E+00<br>0.0000E+00<br>0.0000E+00 | 0.0000E+00<br>0.0000E+00 |
| C(2, 5) | 4.0590E−14<br>−6.3345E−16<br>−3.3851E−11 | 4.6738E−14<br>2.7857E−11<br>−9.3216E−11 | −1.9644E−16<br>3.3082E−12 |

TABLE 6-continued

| C(1, 6) | 0.0000E+00 | 0.0000E+00 | 0.0000E+00 |
| | 0.0000E+00 | 0.0000E+00 | 0.0000E+00 |
| | 0.0000E+00 | 0.0000E+00 | |
| C(0, 7) | −7.3456E−15 | 1.1868E−14 | 6.6607E−16 |
| | 1.5037E−14 | −1.1264E−12 | −4.7888E−12 |
| | 2.1578E−11 | −1.0153E−12 | |

<values corresponding to conditions>

Figure 20:
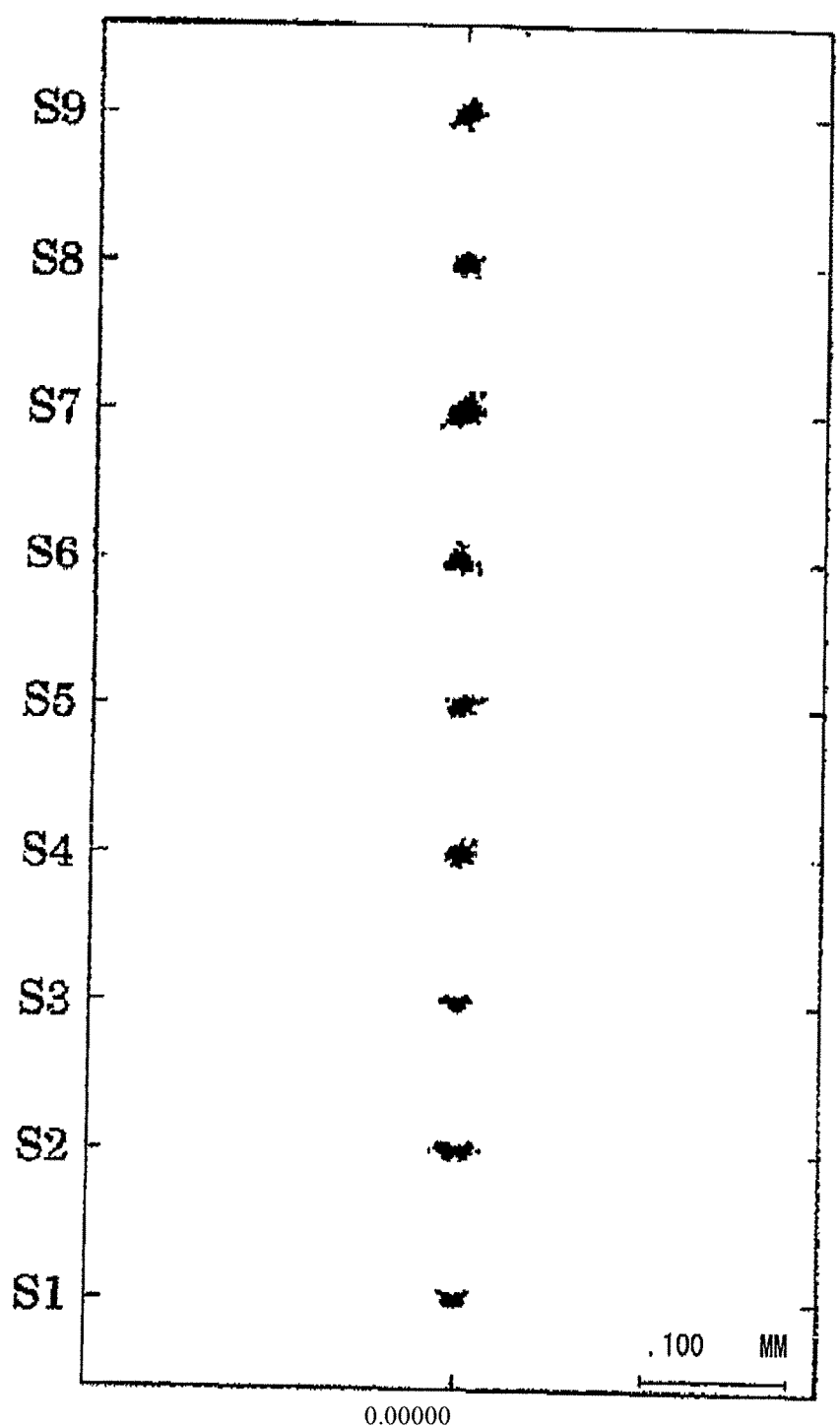
FIG. 20 is a figure showing aberration in this sixth specific example for the g line, for the e line, and for the C line, as spot diagrams.

$\theta 11$ = 34.33 degrees
$\theta 12$ = 35.89 degrees
$\theta 21$ = 21.44 degrees
$\theta 22$ = 23.37 degrees
$\Delta 1 = |\theta 11 - \theta 12| = 1.56$ degrees
$\Delta 2 = |\theta 21 - \theta 22| = 1.93$ degrees FIG. 20 is a figure showing aberration in this sixth example for the g line, for the e line, and for the C line, as spot diagrams. Referring to FIG. 20, it will be understood that in this sixth example as well, in a similar manner to the cases for the first through the fifth examples, the size of the spot at each of the image points S1 through S9 is sufficiently small, and that aberration has been corrected uniformly and well over the entire image plane IM. Moreover it will be understood that the shape of the spot for each of the image points S1 through S9 is almost symmetrical, so that asymmetric aberration has been well corrected. Since, in this sixth example, the protective lens L0 having an incident surface and an exit surface of rotationally asymmetric aspheric form is disposed on the object side of the first reflecting mirror CM1, accordingly the chromatic aberration is corrected more satisfactorily than in the cases of the first through the fifth examples.

As has been explained above, in this embodiment, the generation of asymmetric aberration is suppressed in a satisfactory manner in spite of adapting off-center optical systems, i.e. rotationally asymmetric optical systems. Moreover, in this embodiment, optical systems are implemented with which chromatic aberration for light in the visible wavelength band is sufficiently reduced over an entire image plane of 36 mm×24 mm, which is comparatively broad. It should be understood that it may be contemplated to lighten the reflecting mirrors or the refracting members (lenses or the like) by forming them from resin.

In the above explanation, by way of example, the present invention has been applied to a catadioptric photographic lens for use in a camera. However this is not to be considered as being limitative; the present invention may also be applied to any other appropriate imaging device, in a similar manner.

The content of the disclosure of the following application, upon which priority is claimed, is hereby incorporated herein by reference:

Japanese Patent Application 2012-227,559 (filed on Oct. 15, 2012).

REFERENCE SIGNS LIST

CM1: first reflecting mirror
CM2: second reflecting mirror
L0: protective lens
L1, L2: lenses
IM: image plane
AXa, AXb, AXc: reference axes

The invention claimed is:

1. A catadioptric photographic lens comprising:
a first reflecting mirror, a second reflecting mirror, and a lens group, which are arranged in order from an object so that light reflected by the first reflecting mirror is reflected by the second reflecting mirror before passing through the lens group and forms an image of the object upon a predetermined image plane, wherein:
a center of the object and a center of the first reflecting mirror are aligned on a first reference axis;
a center of the second reflecting mirror and a center of the image plane are aligned on a second reference axis;
the first reference axis and the second reference axis lie in a reference plane and are perpendicular to a second reference plane;
the first reflecting mirror and the second reflecting mirror are off-center on the reference plane;
a reflection surface of the first reflecting mirror is a rotationally asymmetric aspheric surface, and has a shape that is concave toward the object on the reference plane, the center of the first reflecting mirror lying on a first orthogonal plane, the first orthogonal plane being perpendicular to the reference plane and forming a first predetermined angle with respect to the second reference plane;
a reflection surface of the second reflecting mirror is a rotationally asymmetric aspheric surface, the center of the second reflecting mirror lying on a second orthogonal plane, the second orthogonal plane being perpendicular to the reference plane and forming a second predetermined angle with respect to the second reference plane;
a surface in the lens group closest toward the second reflecting mirror is a rotationally asymmetric aspheric surface, a center of the surface of the lens group that is closest toward the second reflecting mirror lying on a third orthogonal plane, the third orthogonal plane being perpendicular to the reference plane and parallel to the second reference axis;
the lens group has a first lens and a second lens that are made from the same optical material as one another;
the first lens and the second lens are arranged in the reference plane such that a first tangent plane tangential to a first incident surface of the first lens and a second tangent plane tangential to a second incident surface of the second lens are inclined in directions that are mutually opposite to a plane perpendicular to the second reference axis, and a third tangent plane tangential to an exit surface of the first lens and a fourth tangent plane tangential to an exit surface of the second lens are inclined in directions that are mutually opposite to the plane perpendicular to the second reference axis;
a chromatic aberration generated by the first lens is corrected by the second lens; and
a chromatic aberration generated by the second lens is corrected by the first lens.

2. The catadioptric photographic lens according to claim 1, wherein
the first lens and the second lens have rotationally asymmetric aspheric surface shapes.

3. The catadioptric photographic lens according to claim 1, wherein
a surface of the first lens toward an object side, a surface of the first lens toward an object image side, a surface of the second lens toward the object side, and a surface of the second lens toward the object image side have rotationally asymmetric aspheric surface shape.

4. The catadioptric photographic lens according to claim 3, wherein
the first tangent plane forms a first angle relative to the plane perpendicular to the second reference axis and the second tangent plane forms a second angle relative to the plane perpendicular to the second reference axis; and
the first angle and the second angle are each greater than 5° and less than 65°.

5. The catadioptric photographic lens according to claim 3, wherein
the first tangent plane forms a first angle relative to the plane perpendicular to the second reference axis and the second tangent plane forms a second angle relative to the plane perpendicular to the second reference axis;
the third tangent plane forms a third angle relative to the plane perpendicular to the second reference axis and the fourth tangent plane forms a fourth angle relative to the plane perpendicular to the second reference axis; and
a magnitude of a difference between the first angle and the third angle is smaller than 35°, and a magnitude of a difference between the second angle and the fourth angle is smaller than 35°.

6. The catadioptric photographic lens according to claim 1, wherein
the first lens and the second lens have meniscus shapes on the third orthogonal plane.

7. The catadioptric photographic lens according to claim 1, wherein
a plane of the object and the image plane are parallel.

8. The catadioptric photographic lens according to claim 1, further comprising:
a protective lens disposed on the first reflecting mirror toward the object, and having an optical surface formed in a rotationally asymmetric aspheric surface shape.

9. The catadioptric photographic lens according to claim 1, wherein
the first reference axis and the second reference axis are parallel to one another.

10. A catadioptric photographic lens comprising:
a first reflecting mirror, a second reflecting mirror, and a lens group, which are arranged in order from an object so that light reflected by the first reflecting mirror is reflected by the second reflecting mirror before passing through the lens group and forms an image of the object upon a predetermined image plane, wherein:
a center of the object and a center of the first reflecting mirror are aligned on a first reference axis;
a center of the second reflecting mirror and a center of the image plane are aligned on a second reference axis;
the first reference axis and the second reference axis lie in a reference plane and are perpendicular to a second reference plane;
the first reflecting mirror and the second reflecting mirror are off-center on the reference plane;
a reflection surface of the first reflecting mirror is a rotationally asymmetric aspheric surface, and has a shape that is concave toward the object on the reference plane, the center of the first reflecting mirror lying on a first orthogonal plane, the first orthogonal plane being perpendicular to the reference plane and forming a first predetermined angle with respect to the second reference plane;
a reflection surface of the second reflecting mirror is a rotationally asymmetric aspheric surface, the center of the second reflecting mirror lying on a second orthogonal plane, the second orthogonal plane being perpendicular to the reference plane and forming a second predetermined angle with respect to the second reference plane;
a surface in the lens group closest toward the second reflecting mirror is a rotationally asymmetric aspheric surface, a center of the surface of the lens group that is closest toward the second reflecting mirror lying on a third orthogonal plane, the third orthogonal plane being perpendicular to the reference plane and parallel to the second reference axis;
the lens group has a first lens and a second lens that are made from the same optical material as one another;
the first lens and the second lens are arranged in the reference plane, the first lens and the second lens being inclined in directions that are mutually opposite to a plane perpendicular to the second reference axis;
a first incident surface is formed in an aspheric surface shape of the first lens, and a plane tangent to the first incident surface forms a first angle relative to the plane perpendicular to the second reference axis;
a second incident surface is formed in an aspheric surface shape of the second lens, and a plane tangent to the second incident surface forms a second angle relative to the plane perpendicular to the second reference axis;
the first angle and the second angle are each greater than 5° and less than 65°;
a chromatic aberration generated by the first lens is corrected by the second lens; and
a chromatic aberration generated by the second lens is corrected by the first lens.

* * * * *